United States Patent
Kanamoto

(10) Patent No.: US 8,149,470 B2
(45) Date of Patent: Apr. 3, 2012

(54) IMAGE PROCESSING APPARATUS ADAPTED TO DETERMINE A NUMBER OF COMPUTING UNITS TO BE ALLOCATED TO IMAGE PROCESSING, AND CORRESPONDING CONTROL METHOD, PROGRAM, AND STORAGE MEDIUM

(75) Inventor: Yoshiji Kanamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1081 days.

(21) Appl. No.: 11/566,417

(22) Filed: Dec. 4, 2006

(65) Prior Publication Data

US 2007/0133030 A1 Jun. 14, 2007

(30) Foreign Application Priority Data

Dec. 5, 2005 (JP) ................................ 2005-351306

(51) Int. Cl.
H04N 1/40 (2006.01)
G06F 7/57 (2006.01)
(52) U.S. Cl. ......................................... 358/448; 712/15
(58) Field of Classification Search .................. 358/448; 712/15
See application file for complete search history.

(56) References Cited

U.S. PATENT DOCUMENTS

| 5,301,344 A | 4/1994 | Kolchinsky |
| 5,786,906 A * | 7/1998 | Shishizuka ................ 358/500 |
| 6,108,101 A * | 8/2000 | Cheng et al. ................ 358/1.9 |
| 2006/0248317 A1* | 11/2006 | Vorbach et al. ............. 712/221 |

FOREIGN PATENT DOCUMENTS

| JP | 01-152581 A | 6/1989 |
| JP | 06-131155 A | 5/1994 |
| JP | 08-076903 | 3/1996 |
| JP | 11-105371 A | 4/1999 |
| JP | 2000-089963 | 3/2000 |
| JP | 2004-310730 | 11/2004 |

\* cited by examiner

*Primary Examiner* — Benny Tieu
*Assistant Examiner* — Eric A Rust
(74) *Attorney, Agent, or Firm* — Canon USA, Inc., I.P. Division

(57) ABSTRACT

An image processing apparatus which performs image processing includes: a computing unit equipped with a plurality of arithmetic units each of which performs calculations based on a supplied microprogram; a storage unit adapted to store correspondence information between image processing and allocation of the plurality of arithmetic units to modules involved in the image processing; an acquisition unit adapted to acquire allocation information about allocations to the modules involved in image processing to be performed, from the storage unit; and a supply unit adapted to supply microprograms corresponding to processes of the modules involved in the image processing to be performed to the arithmetic units based on the acquired allocation information, wherein the storage unit stores the correspondence information according to device configuration of the image processing apparatus, and the acquisition unit acquires the allocation information according to the device configuration of the image processing apparatus.

10 Claims, 29 Drawing Sheets

| | PROCESSING MODE OF EACH MODULE: COLOR/MONOCHROME (FIGURES IN PARENTHESES INDICATE REQUIRED NUMBER OF PROCESSING UNITS) | | |
|---|---|---|---|
| JOB TYPE | SCANNER | CONTROLLER | PRINTER |
| COPY | MONOCHROME (1) | MONOCHROME (1) | MONOCHROME (1) |
| PDL PRINT | — | MONOCHROME (1) | MONOCHROME (1) |
| SEND | COLOR (3) | COLOR (3) | — |

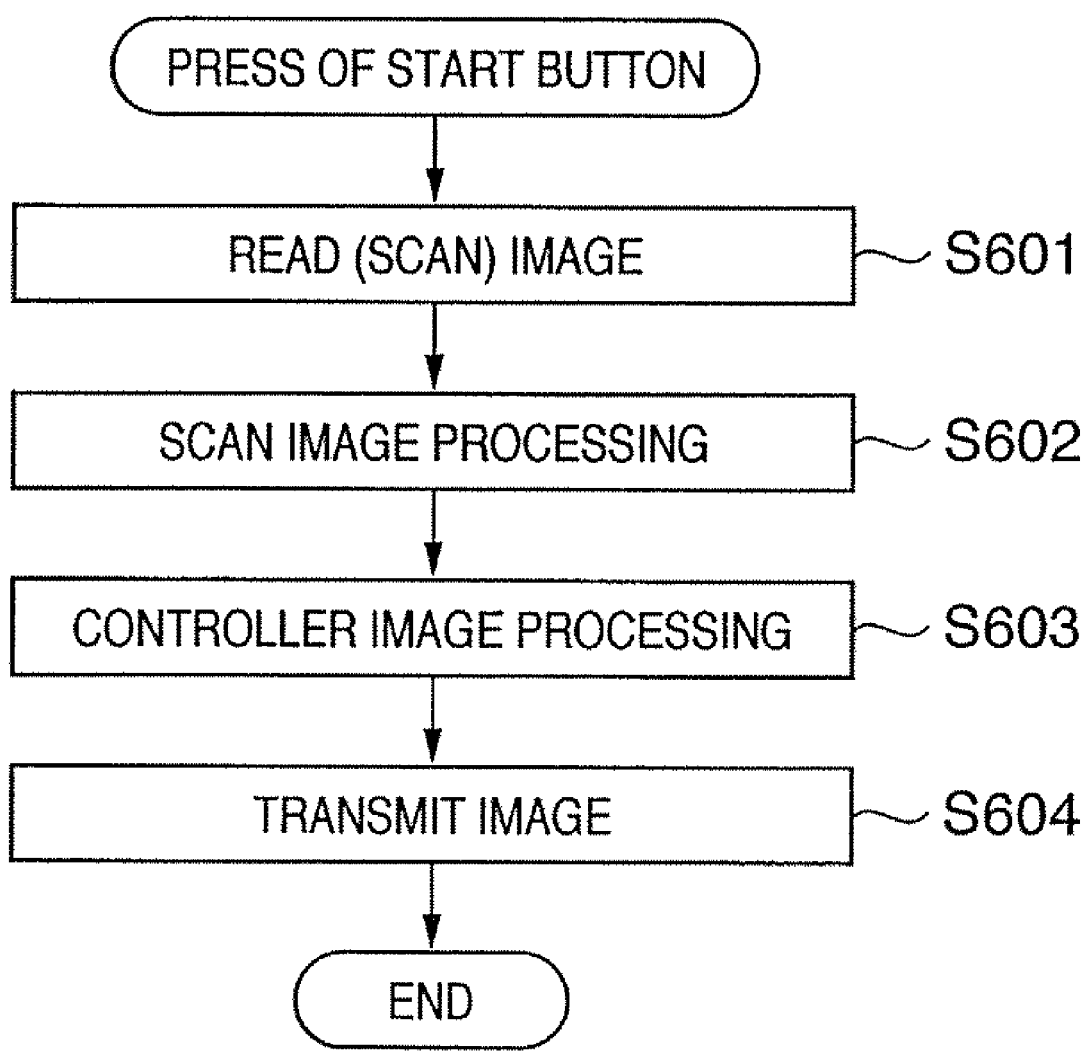

FIG. 7

| | |
|---|---|
| MAJOR PROCESSES IN SCAN IMAGE PROCESSING | EDGE ENHANCEMENT FILTERING; NEGATIVE/POSITIVE INVERSION, TRIMMING, MASKING, GAMMA CONVERSION, SCREENING, AND NOTCH REMOVAL |
| MAJOR PROCESSES IN CONTROLLER IMAGE PROCESSING | ROTATION, RESOLUTION CONVERSION, COMPRESSION, OCR, PDF GENERATION, AND PDL RENDERING |
| MAJOR PROCESSES IN PRINTER IMAGE PROCESSING | COLOR SPACE CONVERSION, PRETREATMENT, RANDOM NUMBER ADDITION, ADD-ON, DENSITY CORRECTION, AND DIRECT MAPPING |

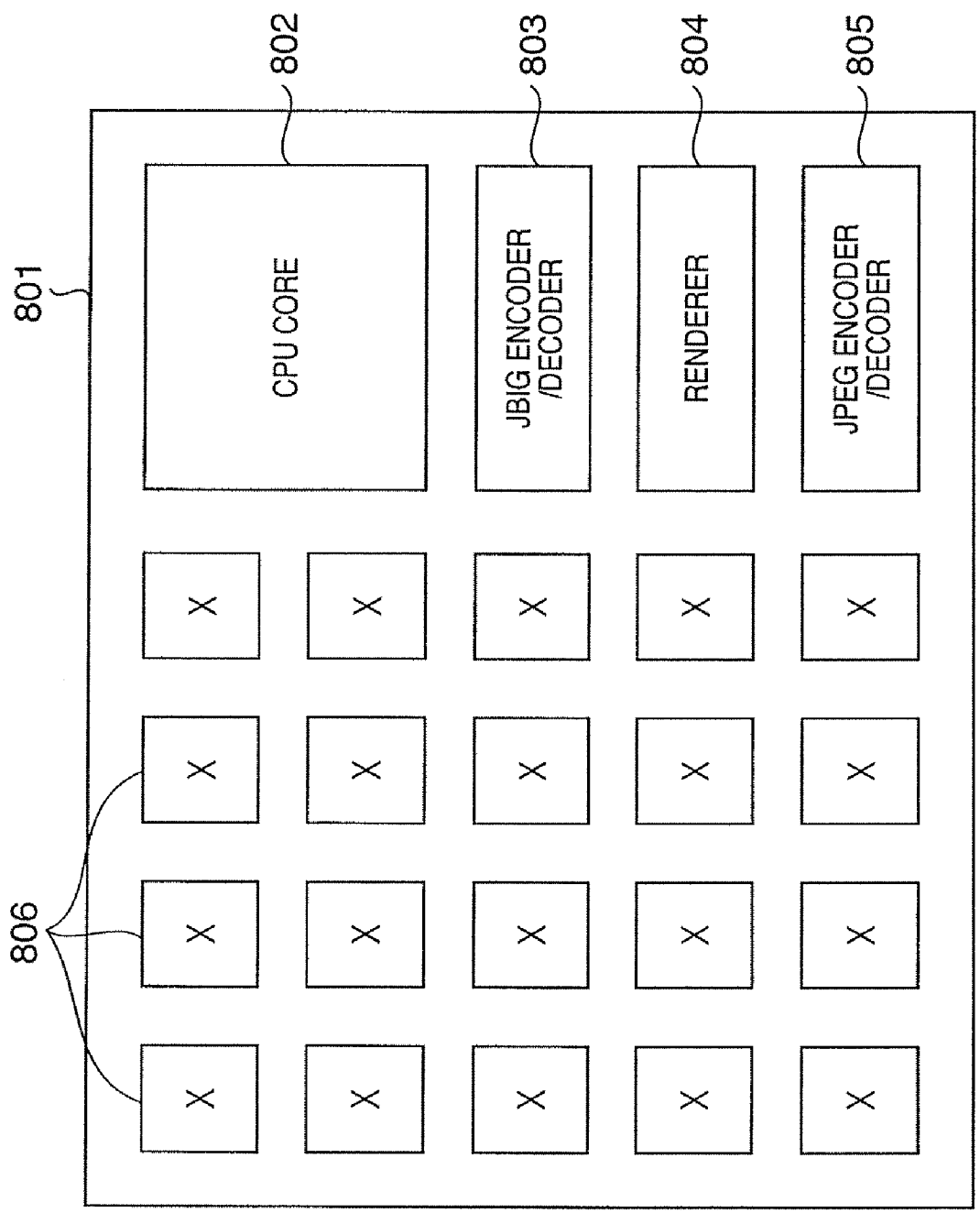

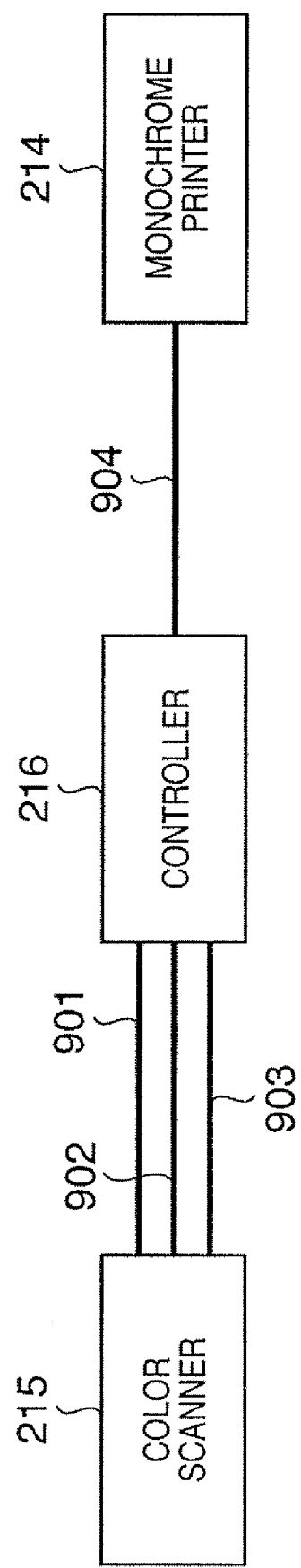

F I G. 10

| JOB TYPE | PROCESSING MODE OF EACH MODULE: COLOR/MONOCHROME (FIGURES IN PARENTHESES INDICATE REQUIRED NUMBER OF PROCESSING UNITS) | | |
|---|---|---|---|
| | SCANNER | CONTROLLER | PRINTER |
| COPY | MONOCHROME (1) | MONOCHROME (1) | MONOCHROME (1) |
| PDL PRINT | — | MONOCHROME (1) | MONOCHROME (1) |
| SEND | COLOR (3) | COLOR (3) | — |

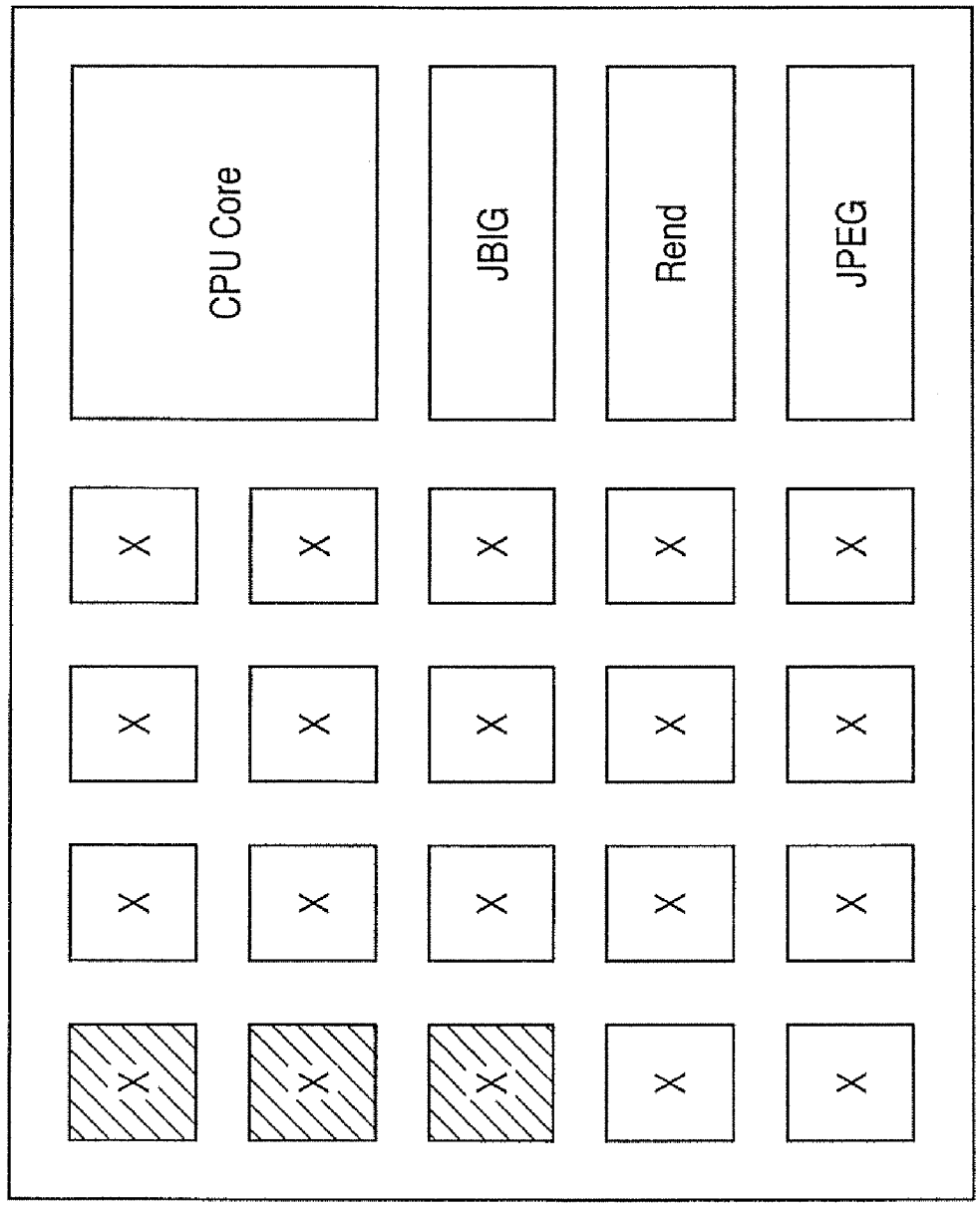

FIG. 13

| JOB TYPE | PROCESSING MODE OF EACH MODULE: COLOR/MONOCHROME (FIGURES IN PARENTHESES INDICATE REQUIRED NUMBER OF PROCESSING UNITS) | | |
|---|---|---|---|
| | SCANNER | CONTROLLER | PRINTER |
| COPY | MONOCHROME (1) | MONOCHROME (1) | MONOCHROME (1) |
| PDL PRINT | — | COLOR (4) | COLOR (4) |
| SEND | MONOCHROME (1) | MONOCHROME (1) | — |

FIG. 15

| JOB TYPE | PROCESSING MODE OF EACH MODULE: COLOR/MONOCHROME (FIGURES IN PARENTHESES INDICATE REQUIRED NUMBER OF PROCESSING UNITS) | | |
|---|---|---|---|
| | SCANNER | CONTROLLER | PRINTER |
| COPY | COLOR (3) | COLOR (4) | COLOR (4) |
| PDL PRINT | — | COLOR (4) | COLOR (4) |
| SEND | COLOR (3) | COLOR (3) | — |

FIG. 17

| JOB TYPE | PROCESSING MODE OF EACH MODULE: COLOR/MONOCHROME (FIGURES IN PARENTHESES INDICATE REQUIRED NUMBER OF PROCESSING UNITS) | | |
|---|---|---|---|
| | SCANNER | CONTROLLER | PRINTER |
| COPY | MONOCHROME (1) | MONOCHROME (1) | MONOCHROME (1) |
| PDL PRINT | — | COLOR (4) | COLOR (4) |
| SEND | COLOR (3) | COLOR (3) | — |

FIG. 19

| JOB TYPE | PROCESSING MODE OF EACH MODULE: COLOR/MONOCHROME (FIGURES IN PARENTHESES INDICATE REQUIRED NUMBER OF PROCESSING UNITS) | | |
|---|---|---|---|
| | SCANNER | CONTROLLER | PRINTER |
| COPY | MONOCHROME (1) | MONOCHROME (1) | MONOCHROME (1) |
| PDL PRINT | — | MONOCHROME (1) | MONOCHROME (1) |
| SEND | COLOR (3) | COLOR (3) | — |

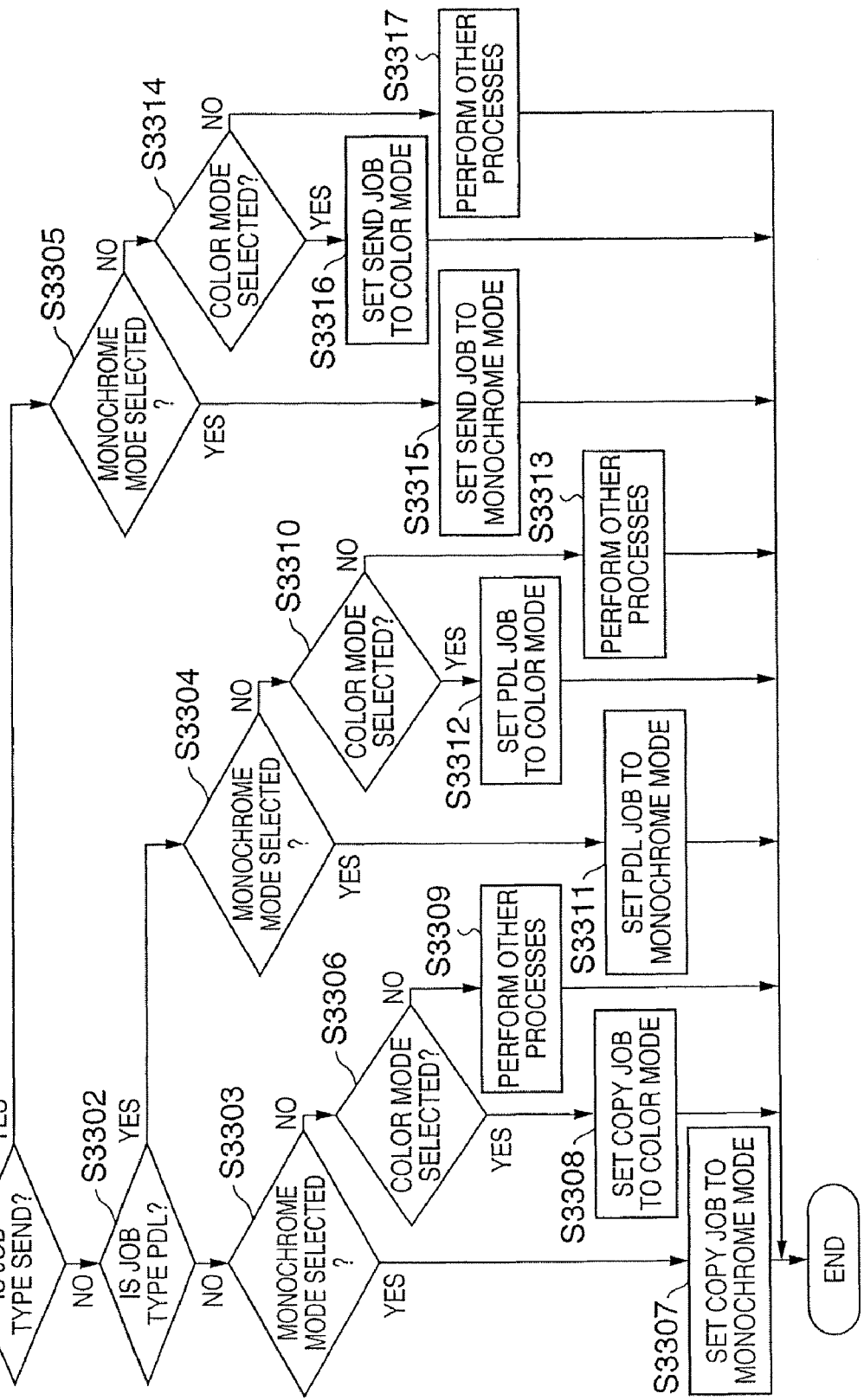

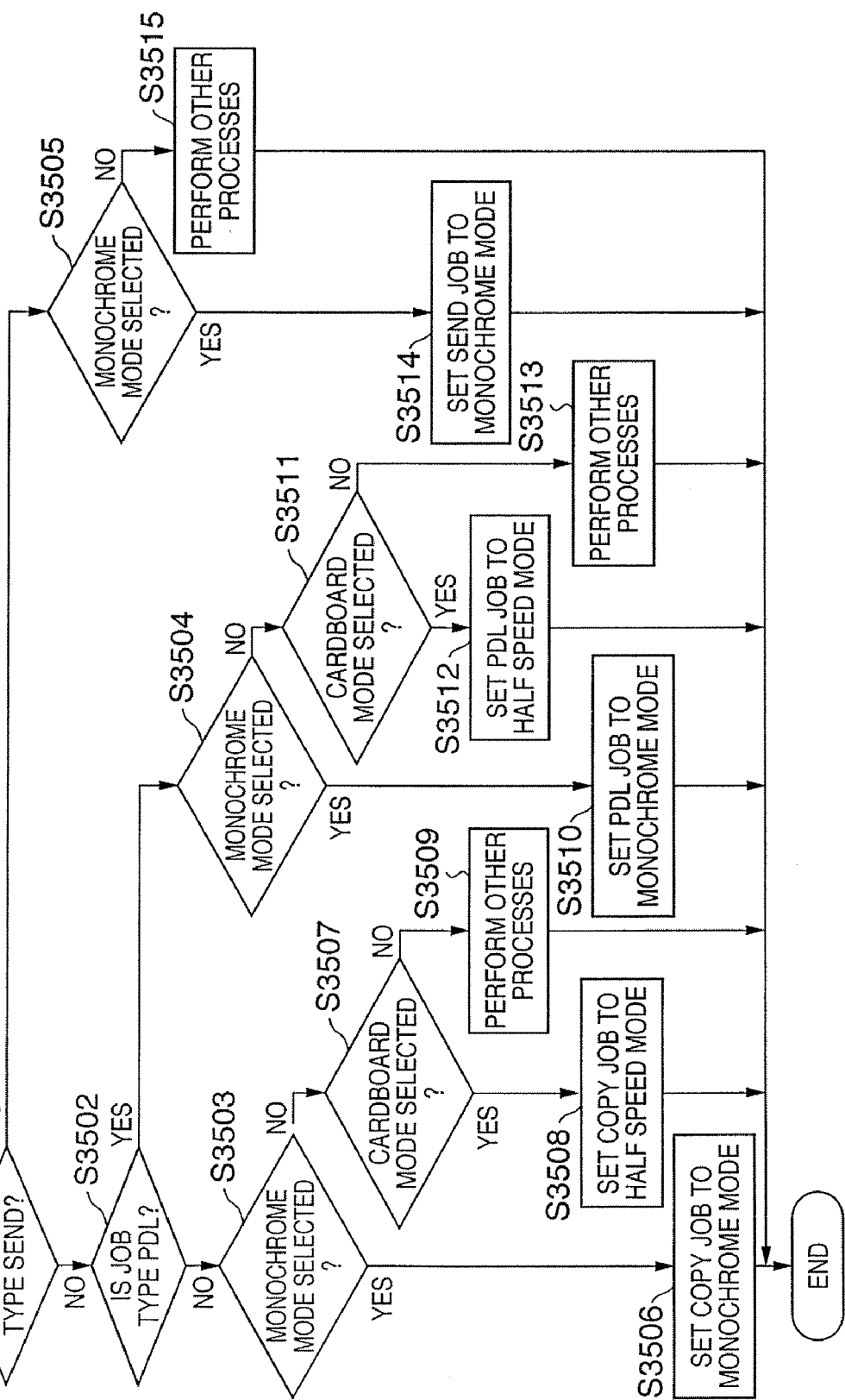

IMAGE PROCESSING APPARATUS ADAPTED TO DETERMINE A NUMBER OF COMPUTING UNITS TO BE ALLOCATED TO IMAGE PROCESSING, AND CORRESPONDING CONTROL METHOD, PROGRAM, AND STORAGE MEDIUM

BACKGROUND OF THE INVENTION

1. Field of the Invention

The present invention relates to an image processing apparatus, control method thereof, program, and storage medium.

2. Description of the Related Art

With advances in functions of multi-functional peripheral devices and other devices involved in image processing, increasingly higher image processing power is required. For example, there is a growing need to run various types of jobs simultaneously on a single device. Also, these types of devices are required to perform increasingly complex and diverse image processing.

With increases in the processing power of computers, specialized tasks which conventionally could only be performed by special-purpose hardware can now be performed on general-purpose computers by controlling them using specialized software. However, since complex processing and vast amounts of data processing are required of the devices involved in image processing as described above, it is difficult for software-based implementation to satisfy the requirements for image processing power. Consequently, hardware-based image processing is still dominant among multi-functional peripheral device.

In this way, conventional configuration uses special-purpose hardware for complex image processing from the viewpoint of processing speed and the like. However, development of such special-purpose hardware involves huge costs. Furthermore, in recent years, along with growth in market needs, product development cycles have been reduced, resulting in steady increases in relative hardware development costs.

On the other hand, reconfigurable processors have come to be known recently. They are equipped with a plurality of general-purpose processing modules and are capable of changing the process contents of the individual general-purpose processing modules dynamically and instantaneously. The behaviors of the individual modules can be defined freely by loading microprograms on the general-purpose processing modules, unlike conventional controllers consisting of hardware modules mounted on an integrated circuit in a fixed manner. Also, by changing the microprograms, it is possible to change the process contents of the individual general-purpose processing modules dynamically and instantaneously. Furthermore, the reconfigurable processors have processing speeds equivalent to that of special-purpose hardware.

Japanese Patent Laid-Open No. 2004-310730 discloses a processing apparatus equipped with reconfigurable processors to reduce its circuit scale.

Given the above background, it is conceivable to implement image processing capabilities required of multi-functional peripheral device using reconfigurable processors. This will presumably make it possible, for example, to avoid cost increases due to bloating hardware size and to give previously unavailable versatility to controllers of multi-functional peripheral device, thereby creating an environment for efficiently implementing the capabilities required of multi-functional peripheral devices.

However, the conventional configuration is not capable of allocating necessary and sufficient general-purpose processing modules to various processes according to processing, devices or other conditions. Consequently, throughput varies with the processes. Also, there are situations in which some processes are not sufficiently allocated the processor resources they need or some processes are allocated more than the necessary processor resources. This can result in poor usability of modules.

Incidentally, the conventional problems described above are true not only for image processing devices, such as multi-functional peripheral devices, but also for any devices which perform processing by means of reconfigurable processors.

SUMMARY OF THE INVENTION

The present invention has been made in view of the above circumstances and has an object to provide a technique for allocating general-purpose processing modules appropriately according to the situation.

To achieve the above object the present invention provides an image processing apparatus which performs image processing, comprising: a computing unit equipped with a plurality of arithmetic units each of which performs calculations based on a supplied microprogram; a storage unit adapted to store correspondence information between image processing and allocation of the plurality of arithmetic units to modules involved in the image processing; an acquisition unit adapted to acquire allocation information about allocations to the modules involved in image processing to be performed, from the storage unit; and a supply unit adapted to supply microprograms corresponding to processes of the modules involved in the image processing to be performed to the arithmetic units based on the acquired allocation information, wherein the storage unit stores the correspondence information according to device configuration of the image processing apparatus, and the acquisition unit acquires the allocation information according to the device configuration of the image processing apparatus.

Further features of the present invention will become apparent from the following description of exemplary embodiments (with reference to the attached drawings).

BRIEF DESCRIPTION OF THE DRAWINGS

FIG. 6 is a flowchart outlining operation of a Send function;

FIG. 7 is a diagram listing major process examples of scan image processing, controller image processing, and print image processing;

FIG. 8 is a diagram illustrating an internal configuration of an integrated circuit equipped with functionality of a CPU which constitutes a main controller and controls image processing and general-purpose processing;

FIG. 9 is a diagram illustrating a connection state of a monochrome printer, color scanner, and controller;

FIG. 10 is a diagram showing an exemplary table which describes the numbers of processing units allocated to individual modules in each function;

FIGS. 11A to 11E are diagrams schematically showing processing units allocated when performing certain functions under certain conditions;

FIG. 13 is a diagram showing an exemplary table which describes the numbers of processing units allocated to individual modules in each function;

FIG. 15 is a diagram showing an exemplary table which describes the numbers of processing units allocated to individual modules in each function;

FIG. 17 is a diagram showing an exemplary table which describes the numbers of processing units allocated to individual modules in each function;

FIG. 19 is a diagram showing an exemplary table which describes the numbers of processing units allocated to individual modules in each function;

FIG. 24 is a flowchart showing a detailed flow of a reconfigurable processing unit allocation table update process caused by a job setting; and FIG. 25 is a flowchart showing a detailed flow of a reconfigurable processing unit allocation table update process caused by a job setting.

DESCRIPTION OF THE EMBODIMENTS

An embodiment of the present invention will be described in detail below with reference to the drawings. However, the components described in the embodiment are only exemplary and are not intended to limit the scope of the present invention.

In a configuration according to this embodiment, a table is stored which represents correspondence between conditions for image processing and the numbers of processing units which perform module processes. Microprograms corresponding to the module processes are supplied to processing units with reference to the table. Thus, the configuration according to this embodiment ensures uniform throughput of image processing while maintaining overall system throughput by allocating the necessary minimum processing units.

(Device Configuration)

Figure 1:
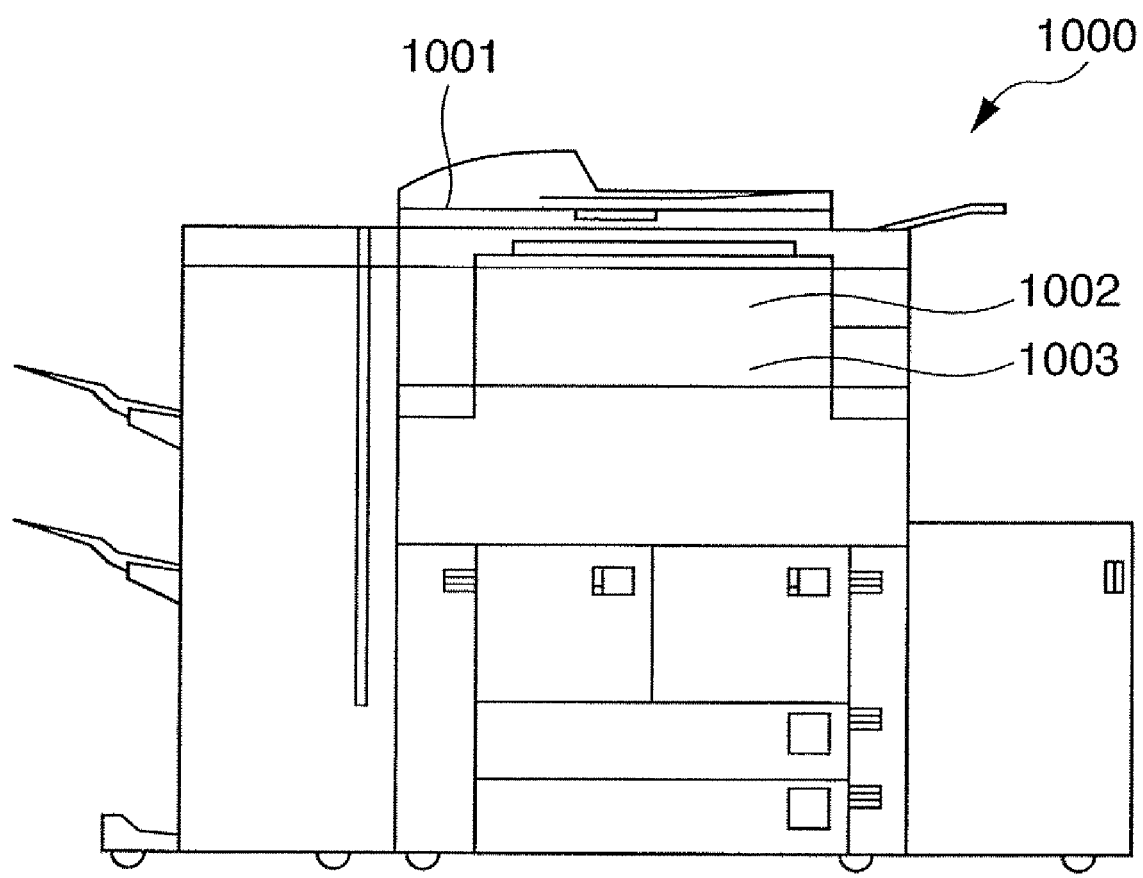
FIG. 1 is a diagram showing appearance of an image processing apparatus according to this embodiment as an example.

FIG. 1 is a diagram showing appearance of an image processing apparatus (multi-functional peripheral device) 1000 according to this embodiment as an example. The image processing apparatus 1000 is equipped with a scanner section 1001 which converts a document into image data, printer section 1002 which prints the image data on a recording medium, and device control section 1003 which controls operation of various modules (components) of the image processing apparatus 1000. The recording medium may be, for example, recording paper, OHP sheets, or the like.

Figure 2:
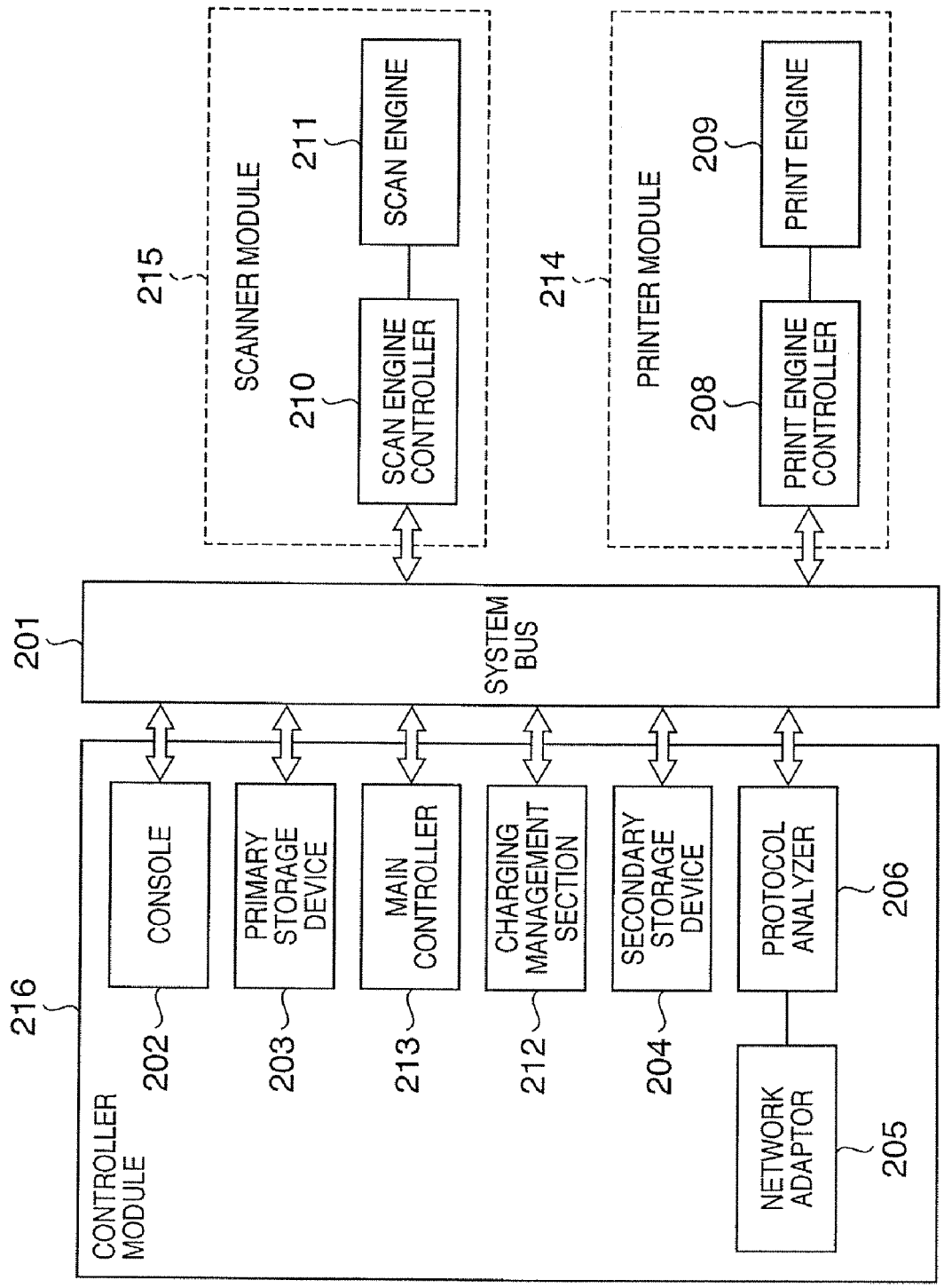
FIG. 2 is a block diagram showing an internal configuration of the image processing apparatus.

FIG. 2 is a block diagram showing an internal configuration of the image processing apparatus 1000 illustrated in FIG. 1. In the device configuration illustrated here, major modules are interconnected via a system bus 201 which mediates transmission and reception of data and control signals. The configuration is cited as an example for purposes of explanation and is not intended to limit embodiments of the present invention.

In FIG. 2, the system bus 201 refers collectively to signal transmission lines for exchanging data and control signals among sub-modules of the image processing apparatus 1000. It includes, for example, an address bus and a data bus, which connect a main controller 213 with a primary storage device 203 as well as an image signal bus used to transmit image data from a scan engine controller 210 to the main controller 213.

A console 202 is a module which an image processing apparatus is generally equipped with. It consists of one or more keys and a display or a touch panel. The console 202 functions as a user interface which accepts user actions with respect to the image processing apparatus 1000 and displays responses to the user actions.

The primary storage device 203 and a secondary storage device 204 are semiconductor storage devices or magnetic recording devices. They store data used for printing by various programs or the system as well as data used by the system, on a temporary or long-term basis.

A network adaptor 205 is a module used to exchange information with external devices connected via a network. A protocol analyzer 206 is a module that processes data received by the network adaptor 205, according to a communications protocol, and converts the data into data in format compatible with the image processing apparatus 1000. However, operation of the network adaptor 205 and protocol analyzer 206 are known, and thus detailed description thereof will be omitted.

A print engine controller 208 is a module that controls operation of a print engine 209. Data to be printed is sent out to the print engine 209 via the print engine controller 208. The print engine 209 performs a physical printing process based on the received data. The operation and configuration involved here are also known, and thus detailed description thereof will be omitted.

A scan engine 211 and scan engine controller 210 are modules that optically scan a paper document and convert it into electronic information. Their operation and configuration are also known, and thus detailed description thereof will be omitted.

A charging management section 212 is a module that undertakes management for proper charging based on usage of the image processing apparatus 1000 by the user and quantities of consumables and the like used for a printing process. The main controller 213 controls operation of the above modules and performs processes in order for the modules to carry out predetermined functions. For example, it interprets PLD data and performs image processing and the like.

As shown in FIG. 2, the image processing apparatus 1000 is divided into three functional module groups (sets of modules): printer module 214, scanner module 215 and controller module 216. Hereinafter, the printer module will be referred to as a printer, the scanner module as a scanner, and the controller module as a controller. Incidentally, the printer corresponds to the printer section 1002 in FIG. 1. The scanner corresponds to the scanner section 1001 in FIG. 1. The controller corresponds to the control section 1003 in FIG. 1.

(Program Configuration)

Figure 3:
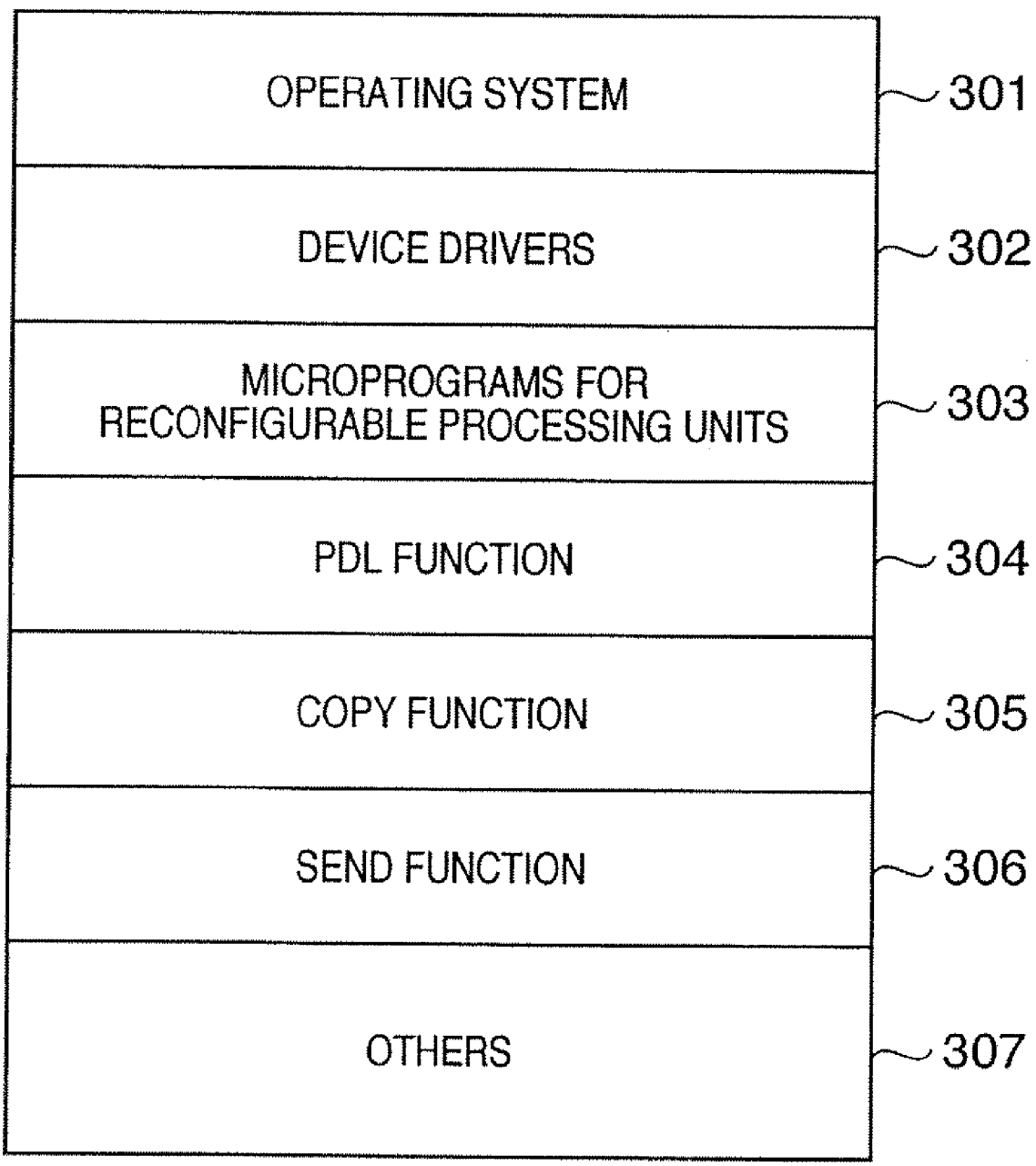
FIG. 3 is a diagram showing an exemplary configuration of a program which controls operation of the image processing apparatus according to this embodiment.

FIG. 3 is a diagram showing an exemplary configuration of a program that controls operation of the image processing apparatus 1000 according to this embodiment. The program is stored in the secondary storage device 204. It is loaded onto the primary storage device 203 as required and executed by the main controller 213.

An operating system 301 is basic software that manages various devices of the image processing apparatus 1000 according to this embodiment and controls their operation. The operating system 301 provides a basic platform for all other software.

Device drivers 302 are device control programs used to operate various devices.

Microprograms 303 for reconfigurable processing units are programs which control reconfigurable processing units (general-purpose processing modules or arithmetic units) in the configuration according to this embodiment. The reconfigurable processing units will be described later.

A PDL function 304 is a program that implements PDL capabilities among capabilities provided by the image processing apparatus 1000 according to this embodiment.

A Copy function 305 is a program which implements Copy capabilities among the capabilities provided by the image processing apparatus 1000 according to this embodiment.

A Send function 306 is a program which implements Send capabilities among the capabilities provided by the image processing apparatus 1000 according to this embodiment. The Send capabilities consist in sending images scanned and acquired by the image processing apparatus 1000 to external clients after performing various image processing. The external clients include personal computers and FAX machines. The various image processing involves a great many processes including an OCR process.

The others 307 include programs other than those described above, data, and free space.

The program configuration described above has been cited to illustrate operation and effects of the configuration according to this embodiment and, needless to say, is not meant to be limiting.

(Overview of Functions' Processes)

Next, processes of the Copy function 305, PDL function 304, and Send function 306 will be outlined.

Figure 4:
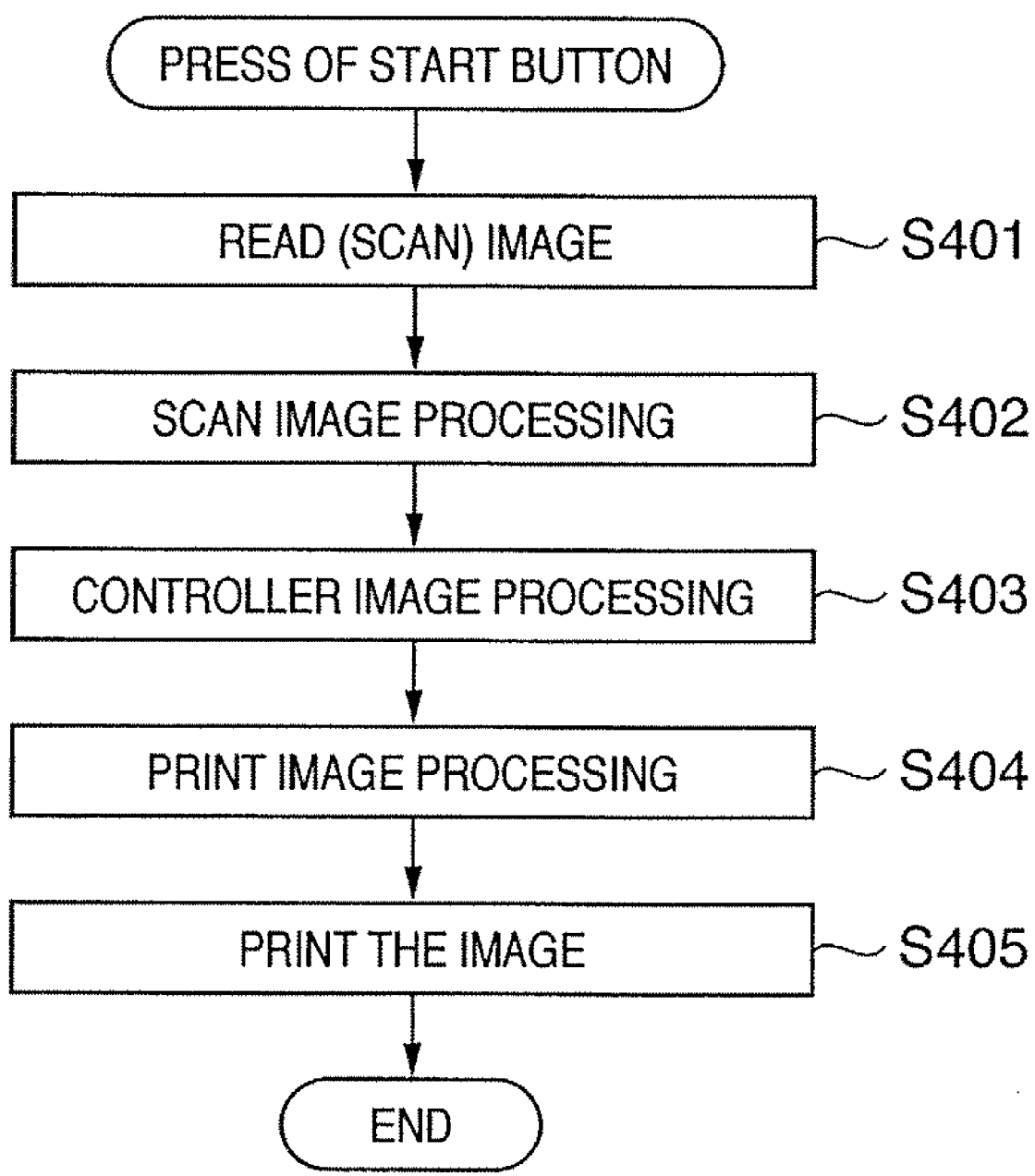
FIG. 4 is a flowchart outlining operation of a Copy function.

FIG. 4 is a flowchart outlining operation of the Copy function 305 in FIG. 3. When the user presses a start button after making various settings on the console 202, an actual copy process is started. When the copy process is started, the scanner 215 reads an image (Step S401). Next, a scan image processing is performed on resulting image data (Step S402). A controller image processing is performed subsequent to the scan image processing (Step S403). Next, a print image processing is performed (Step S404). Finally, the image is printed on the printer 214 to complete the process.

Figure 5:
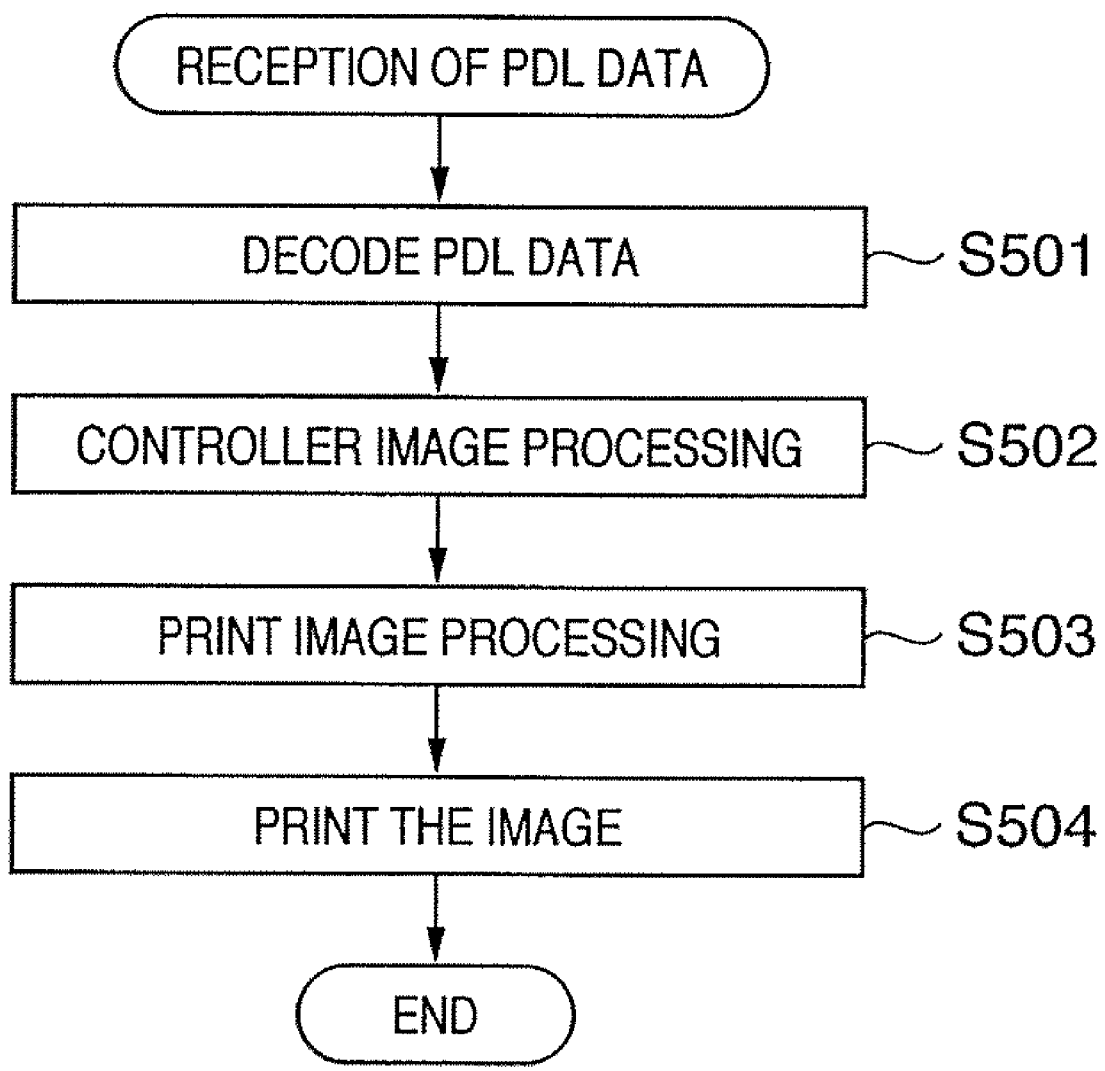
FIG. 5 is a flowchart outlining operation of a PDL function.

FIG. 5 is a flowchart outlining an operation of the PDL function 304 in FIG. 3. Unlike the Copy function 305 in FIG. 4, the PDL function 304 starts a processing when the network adaptor 205 receives PDL data from a client machine connected to the image processing apparatus 1000 via a network. The received PDL data is then interpreted and decoded (Step S501). Next, a controller image processing is performed (Step S502). Next, a print image processing is performed (Step S503). Finally, the image is printed on the printer 214 to complete the process.

FIG. 6 is a flowchart outlining an operation of the Send function 306 in FIG. 3. As is the case with the Copy function 305 in FIG. 4, the Send function 306 starts an actual processing when the user presses a start button after making various settings on the console 202. When the send process is started, the scanner 215 reads an image (Step S601). Next, a scan image processing is performed on resulting image data (Step S602). A controller image processing is performed subsequent to the scan image processing (Step S603). Next, an image to be transmitted is created and transmitted to a specified client machine (Step S604). This completes the process.

As described with reference to FIGS. 4, 5, and 6, the Copy function 305 uses the printer 214 and the scanner 215 for processing. On the other hand, the PDL function 304 uses only the printer 214 and the Send function 306 uses only the scanner 215. In other words, whereas the Copy function 305 performs a print image processing and a scan image processing, the PDL function 304 performs only the print image processing and the Send function 306 performs only the scan image processing.

In this way, the modules 214, 215, and/or 216 used vary with the function. Also, the load required to run the modules 214, 215, or 216 varies, for example, depending on whether the function is executed in color mode or monochrome mode. The load required to run the modules 214, 215, or 216 also varies, for example, with the processing power, device configuration, or device status of the printer, scanner, or the like. In this way, the load required to run the modules 214, 215, or 216 varies with the processing conditions.

FIG. 7 is a diagram listing major process examples of the scan image processing, controller image processing, and print image processing described with reference to FIGS. 4, 5, and 6. One or more types of image processing are performed in combination according to the mode in which the given function is executed. For example, the scan image processing can be performed using a combination of edge enhancement filtering, trimming, and masking. On the other hand, the controller image processing can be performed through a PDF creation process. Also, the printer image processing can be performed using a combination of color space conversion, random number addition, density correction, and direct mapping. Incidentally, the above examples are cited only to illustrate the configuration according to this embodiment and are not meant to be limiting. Needless to say, any type of image processing other than those described herein is included in the scope of the present invention as long as it satisfies conditions set forth in the appended claims.

FIG. 8 is a diagram illustrating an internal configuration of an integrated circuit 801 equipped with functionality of a CPU which constitutes the main controller 213 shown in FIG. 2 and controls image processing and general-purpose processing. The integrated circuit 801 contains a CPU core 802 which performs data processing, controls devices and buses, executes programs, and so on. The role and function of the CPU core 802 are the same as those of CPUs used in typical personal computers and the like, and thus detailed description thereof will be omitted.

A JBIG encoder/decoder 803 is a JBIG-format compression/decompression circuit and is used to compress/decompress monochrome image data. A JPEG encoder/decoder 805 is a JPEG-format compression/decompression circuit and is used mainly to compress/decompress color image data. Renderer 804 is a circuit that interprets and decodes PDL data.

Reconfigurable processing units (general-purpose processing modules or arithmetic units: hereinafter referred to as processing units) 806 (denoted by X in FIG. 8) allow their process contents to be defined freely. Multiple processing units are mounted as shown in FIG. 8. Behavior of the processing units 806 can be defined freely by loading and executing microprograms 303 for reconfigurable processing units stored in the secondary storage device 204. Moreover, the process contents of each unit can be changed dynamically at an instant by changing the microprogram 303.

In this embodiment, processing units 806 are used as image processing circuits. Thanks to the features described above, a processing unit 806 can serve multiple roles as an image processing circuit if the microprogram loaded on the processing unit is changed. Consequently, the configuration according to this embodiment is highly versatile unlike controllers such as conventional image processing circuits in which hardware modules are mounted in a fixed manner.

With the configuration according to this embodiment, in view of the fact that the load required to run each module varies with the processing conditions, the process of each module is performed using appropriate processing units allocated according to the processing conditions. That is, the larger the load required to run the module, the larger the number of processing units allocated to the module.

(Allocation Table)

FIG. 9 is a diagram illustrating a state of connection with the controller 216 in the configuration of the image processing apparatus 1000 shown in FIG. 2 when the printer 214 is a monochrome printer and the scanner 215 is a color scanner. These modules are connected via the system bus 201 as described with reference to FIG. 2, but image signal bus levels are indicated in FIG. 9 to show the connection state in more detail.

Since the scanner 215 in the example of FIG. 9 is a color scanner, color image data is transmitted from the scanner 215 to the controller 216. Therefore, there are three image signal buses for three colors of R (Red), G (Green), and B (Blue) between the scanner 215 and controller 216.

On the other hand, since the printer 214 in the example of FIG. 9 is a monochrome printer, monochrome image data is transmitted from the controller 216 to the printer 214. Therefore, there is one signal bus of BK (Black) between the controller 216 and printer 214.

In the example of FIG. 9, since the scanner 215 is a color scanner and the printer 214 is a monochrome printer, the Copy function 305 and PDL function 304 which use the printer 214 can operate only in monochrome mode.

On the other hand, the Send function 306 which uses the scanner 215, but does not use the printer 214 can use all execution modes supported by the scanner 215. That is, since the scanner 215 in this case is a color scanner, the Send function 306 can use both color mode and monochrome mode.

In the configuration according to this embodiment, information which represents correspondence between conditions for image processing and the numbers of processing units allocated to modules to perform image processing is stored in the primary storage device 203. Allocation control performed with reference to this information makes it possible to allocate appropriate processing units according to processing conditions. The allocation control is performed as microprograms corresponding to module processes are supplied to the processing units 806.

FIG. 10 is a diagram showing a table which describes the numbers of processing units 806 allocated to individual modules in each function (job), as an example of information which represents the correspondence between the conditions for image processing and the numbers of allocated processing units. The image processing apparatus 1000 whose configuration is shown in FIG. 9 determines in which mode each function—Copy, PDL, or Send—is executed in each type of image processing, i.e., Scan, Controller, or Printer, shown in FIG. 7: color mode or monochrome mode. After that, by referring to the table in FIG. 10, the image processing apparatus 1000 determines how many processing units 806 should be allocated to each type of image processing. In FIG. 10, figures in parentheses indicate the number of processing units 806 allocated to each type of image processing (module) under predetermined conditions. Hereinafter, this table will be referred to as the reconfigurable processing unit allocation table (allocation table).

Incidentally, when multiple types of image processing are to be performed on the scanner 215, controller 213, or printer 214 or if image processing itself is complex, more than one processing unit may be required. However, in this embodiment, it is assumed for the sake of simplicity that one processing unit 806 is used per color in image processing. Thus, for example, one processing unit is allocated in monochrome mode regardless of the types of image processing, three processing units are allocated in RGB color mode, and four processing units are allocated in CMYK color mode. That is, microprograms corresponding to module processes are supplied to that many processing units 806 which are indicated in the table.

In this way, with the configuration according to this embodiment, appropriate processing units are allocated according to the colors (monochrome, RGB colors, CMYK colors, or the like) used in image processing. That is, with the configuration according to this embodiment, the number of processing units to be allocated is determined according to parallelism of data and microprograms are supplied to the determined number of processing units 806. The amount of data increases in the order: monochrome, RGB color, CMYK color. The load of image processing increases proportionally. Besides, data is transmitted and received via parallel buses, and thus image processing can be performed in parallel. Thus, it is possible to ensure uniform throughput of image processing by allocating a larger number of processing units 806 to modules which involve heavier loads while maintaining overall system throughput by allocating the minimum necessary number of processing units 806.

Although in this embodiment, the reconfigurable processing unit allocation table is held in the primary storage device 203, it may be held in the main controller. Also, according to this embodiment, one, three, and four processing units 806 are allocated respectively to monochrome image processing, RGB-color image processing, and CMYK-color image processing in a fixed manner, as described above. However, these figures are only an example determined based on the parallelism of buses over which data is transmitted and received. That is, the number of processing units allocated to image processing is not limited to these figures as described above, and any number of processing units is included in the scope of the present invention as long as it satisfies conditions set forth in the appended claims.

Also, in the configuration according to this embodiment, to ensure uniform throughput, a larger number of processing units 806 are allocated to a process with higher computational costs and the number of allocated processing units 806 is controlled according to the number of colors used. However, this is not restrictive. That is, uniform throughput among modules may be ensured by performing allocation control based on another parameter. For example, relationship between the number of processing units 806 and throughput may be determined in advance for each of the scanner 215, controller 213, and printer 214 and allocation control may be performed based on this relationship. Alternatively, allocations may be controlled depending on a combination of processes to be executed out of the module processes shown in FIG. 7 as an example.

FIGS. 11A to 11E are diagrams schematically showing processing units allocated when performing certain functions under certain conditions. Shaded parts in FIGS. 11A to 11E represent the processing units allocated to processes.

For example, when performing a Copy job under the conditions shown in FIG. 10, three processing units are allocated in total: one each to monochrome scan image processing, monochrome controller image processing, and monochrome print image processing. The usage in this case is shown in FIG. 11B.

Figure 11A:
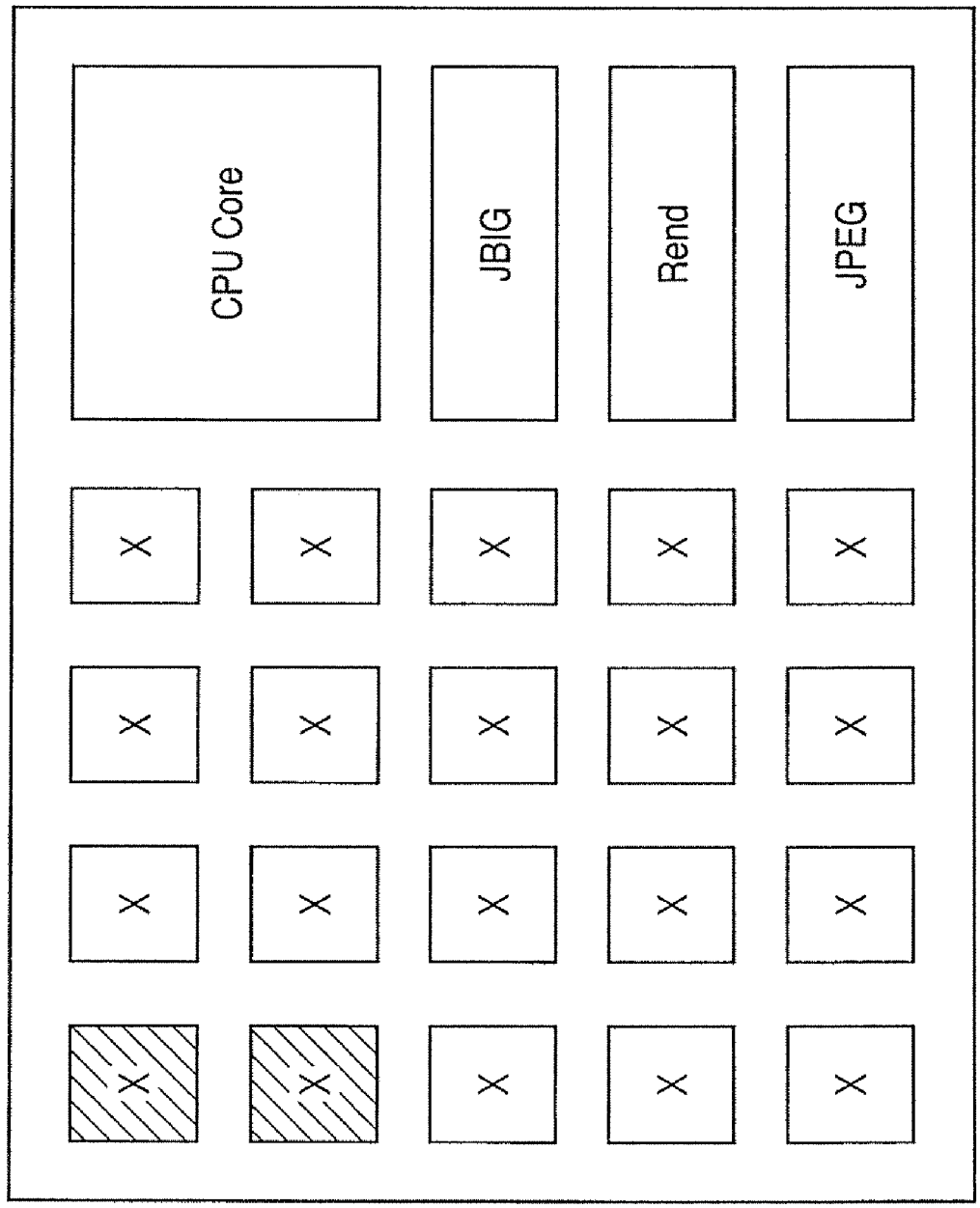

When performing a PDL job under the conditions shown in FIG. 10, two processing units are allocated in total: one each to monochrome controller image processing and monochrome print image processing. The usage in this case is shown in FIG. 11A.

Figure 11C:
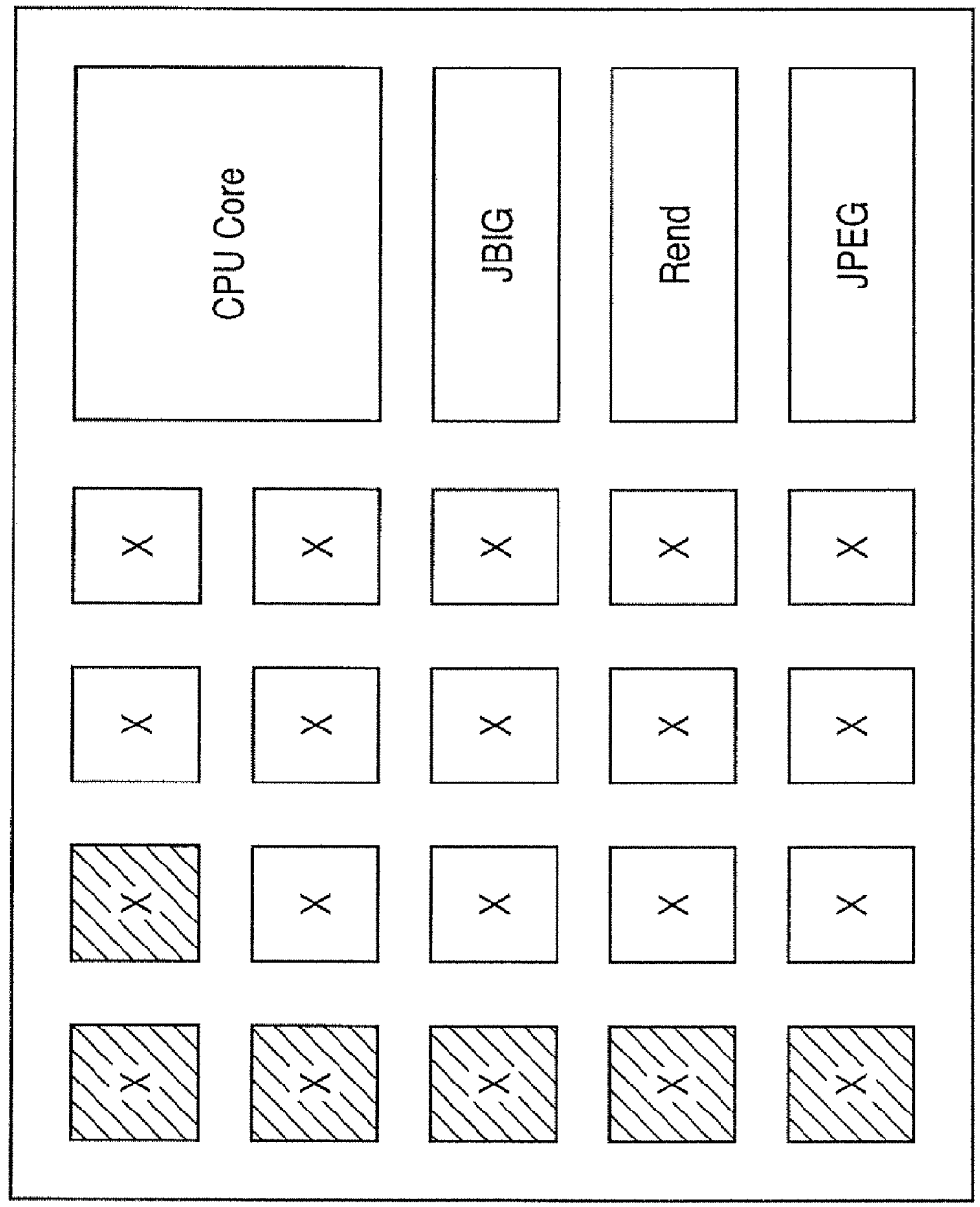

When performing a Send job under the conditions shown in FIG. 10, six processing units are allocated in total: three each to RGB-color scan image processing and RGB-color controller image processing. The usage in this case is shown in FIG. 11C.

[Another Table Example 1]

Figure 12:
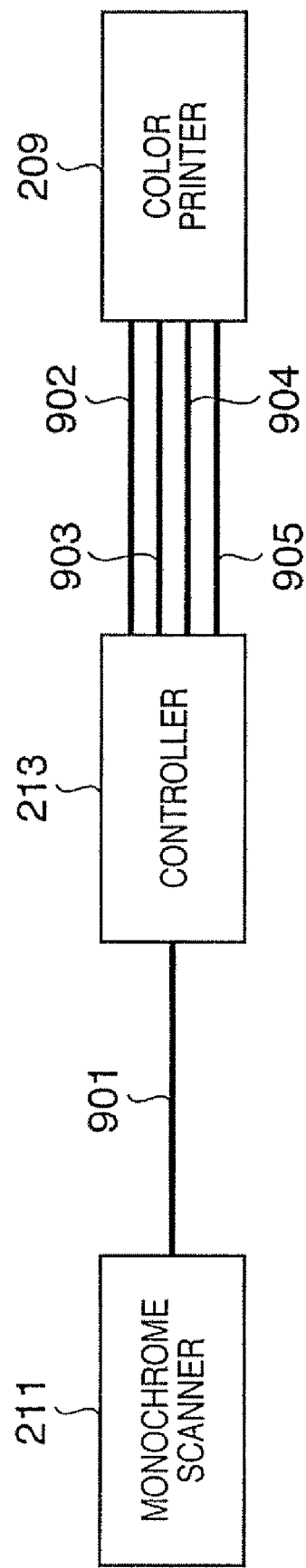
FIG. 12 is a diagram illustrating a connection state of a color printer, monochrome scanner, and controller.

FIG. 12 is a schematic diagram illustrating a state of connection with the controller 216 in the configuration of the image processing apparatus 1000 shown in FIG. 2 when the printer 214 is a color printer and the scanner 215 is a monochrome scanner. These modules are connected via the system bus 201 as also described with reference to FIG. 2, but image signal bus levels are indicated in FIG. 12 to show the connection state in more detail.

Since the scanner 215 in the example of FIG. 12 is a monochrome scanner, monochrome image data is transmitted from the scanner 215 to the controller 216. Therefore, there is one image signal bus between the scanner 215 and controller 216. On the other hand, since the printer 214 in the example of FIG. 12 is a color printer, color image data is transmitted from the controller 216 to the printer 214. Therefore, there are four image signal buses for four colors of cyan, magenta, yellow, and black (CYMK) between the controller 216 and printer 214.

In the example of FIG. 12, since the scanner 215 is a monochrome scanner and the printer 214 is a color printer, the Copy function and Send function which use the scanner 215 can be executed only in monochrome mode. On the other hand, the PDL function which uses the printer 214, but does not use the scanner 215 can use all execution modes supported by the printer 214. That is, since the printer 214 in this case is a color printer, the PDL function can use both color mode and monochrome mode.

FIG. 13 is a diagram showing an exemplary table which describes the numbers of processing units 806 allocated to individual modules in each function (job) in the configuration shown in FIG. 12. As in the case of FIG. 10, figures in parentheses indicate the number of processing units 806 allocated to each type of image processing in each case. The reconfigurable processing unit allocation table has been described with reference to FIG. 10, and thus description thereof will be omitted here.

When performing a Copy job under the conditions shown in FIG. 13, three processing units are allocated in total: one each to monochrome scan image processing, monochrome controller image processing, and monochrome print image processing. The usage in this case is shown in FIG. 11B.

Figure 11D:
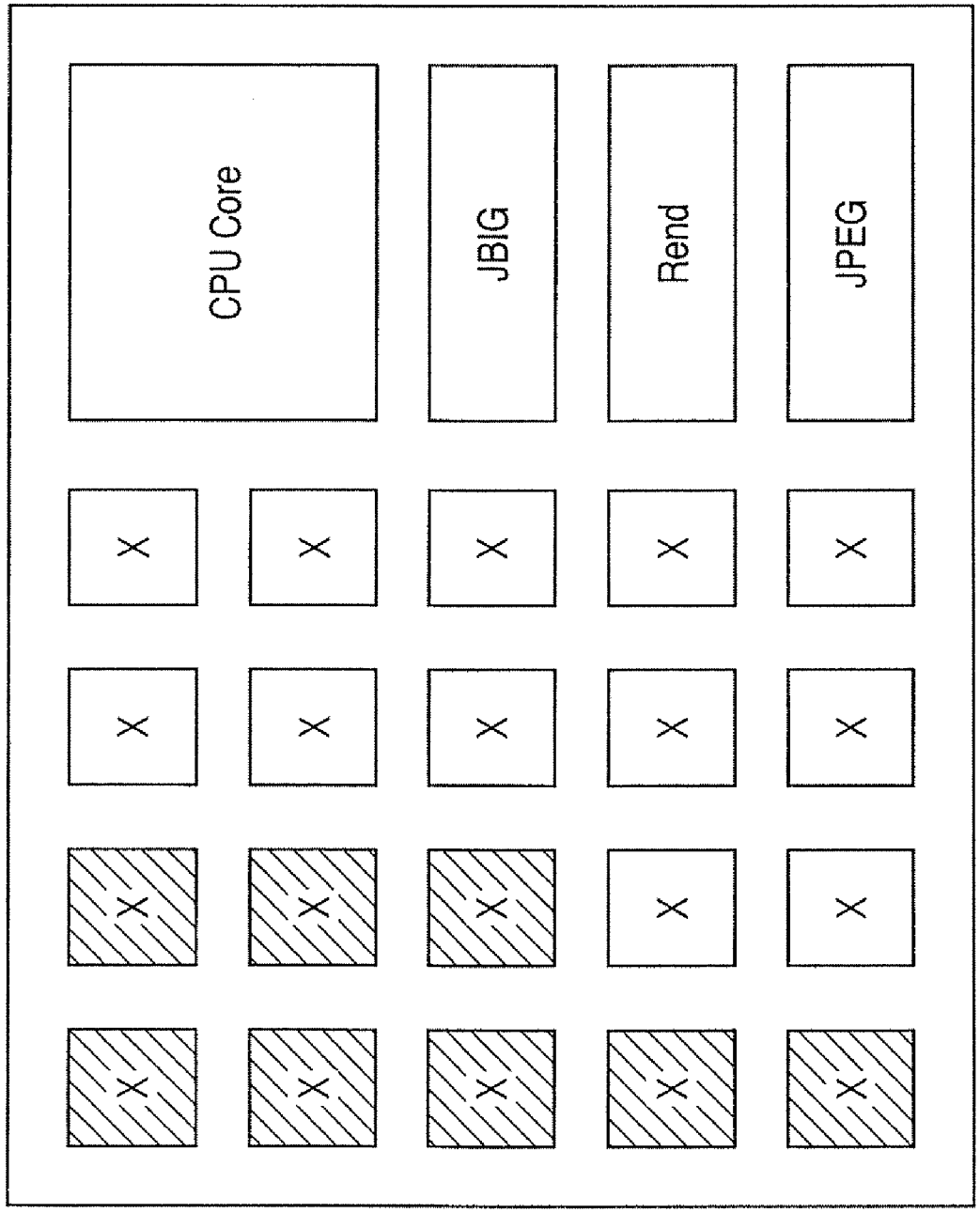

When performing a PDL job under the conditions shown in FIG. 13, eight processing units are allocated in total: four each to CYMK-color controller image processing and CYMK-color print image processing. The usage in this case is shown in FIG. 11D.

When performing a Send job under the conditions shown in FIG. 13, two processing units are allocated in total: one each to monochrome scan image processing and monochrome controller image processing. The usage in this case is shown in FIG. 11A.

[Another Table Example 2]

Figure 14:
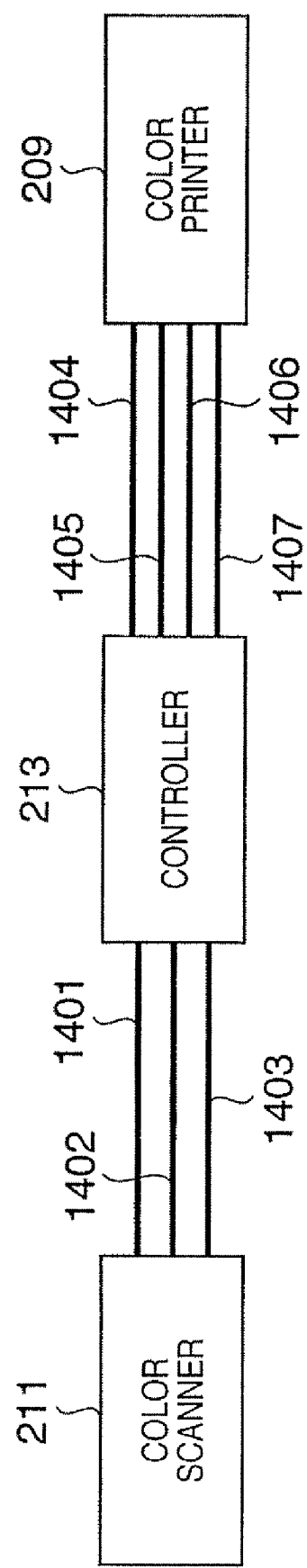
FIG. 14 is a diagram illustrating a connection state of a color printer, color scanner, and controller.

FIG. 14 is a schematic diagram illustrating a state of connection with the controller 216 in the configuration of the image processing apparatus 1000 shown in FIG. 2 when the printer 214 is a color printer and the scanner 215 is a color scanner. These modules are connected via the system bus 201 as also described with reference to FIG. 2, but image signal bus levels are indicated in FIG. 14 to show the connection state in more detail.

Since the scanner 215 in the example of FIG. 14 is a color scanner, color image data is transmitted from the scanner 215 to the controller 216. Therefore, there are three image signal buses for three colors of red, green, and blue between the scanner 215 and controller 216. On the other hand, since the printer 214 in the example of FIG. 14 is a color printer, color image data is transmitted from the controller 216 to the printer 214. Therefore, there are four image signal buses for four colors of cyan, magenta, yellow, and black between the controller 216 and printer 214.

That is, in the example of FIG. 14, since both scanner 215 and printer 214 are color-capable, all the functions of Copy, PDL, and Send can be executed both in monochrome and color mode.

FIG. 15 is a diagram showing an exemplary table which describes the numbers of processing units 806 allocated to individual modules in each function (job) in the configuration shown in FIG. 14. As in the case of FIG. 10, figures in parentheses indicate the number of processing units 806 allocated to each type of image processing in each case. The reconfigurable processing unit allocation table has been described with reference to FIG. 10, and thus description thereof will be omitted here.

Figure 11E:
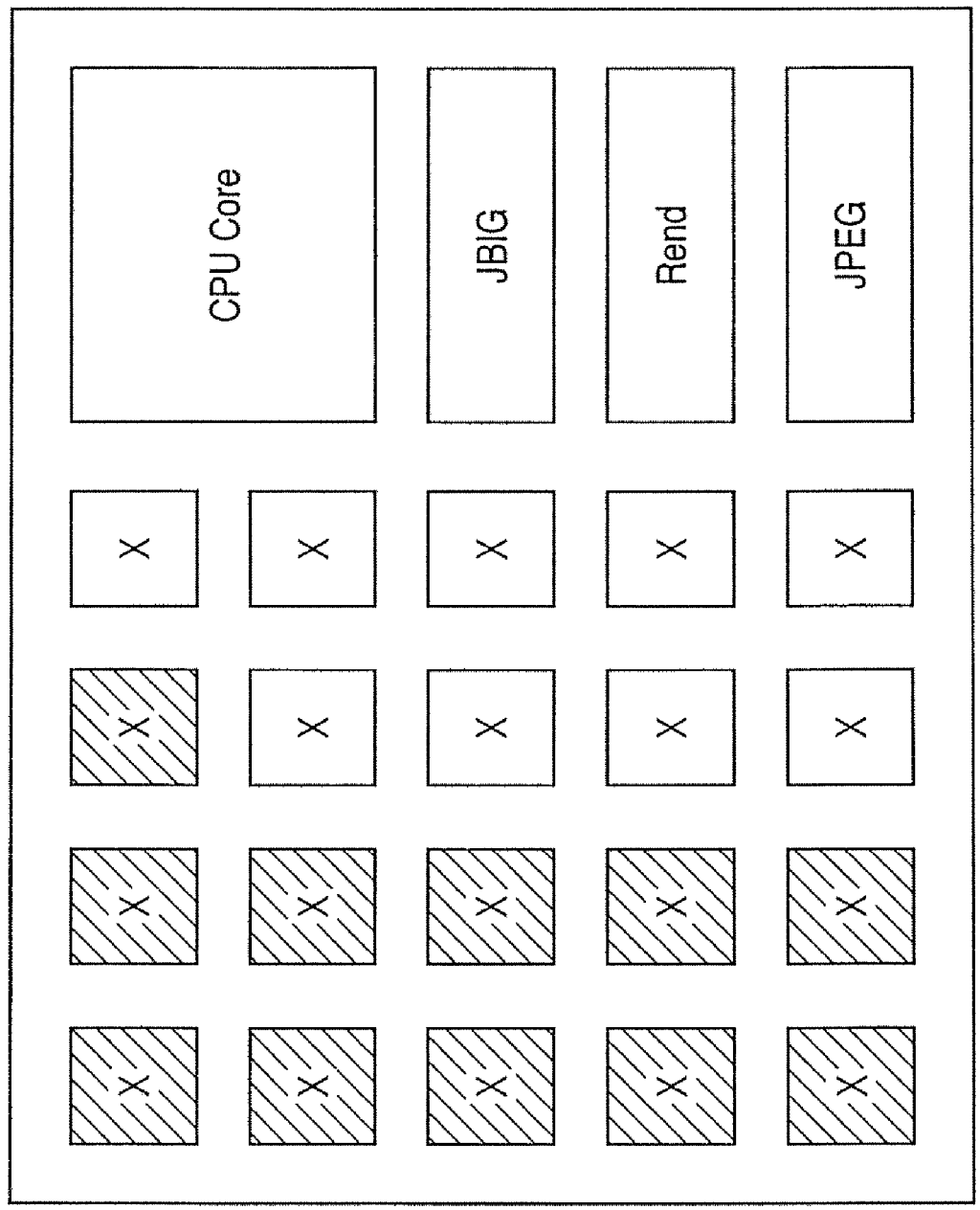

When performing a Copy job under the conditions shown in FIG. 15, eleven processing units are allocated in total: three to RGB-color scan image processing, four to CYMK-color controller image processing, and four to CYMK-color print image processing. The usage in this case is shown in FIG. 11E.

When performing a PDL job under the conditions shown in FIG. 15, eight processing units are allocated in total: four each to CYMK-color controller image processing and CYMK-color print image processing. The usage in this case is shown in FIG. 11D.

When performing a Send job under the conditions shown in FIG. 15, six processing units are allocated in total: three each to RGB-color scan image processing and RGB-color controller image processing. The usage in this case is shown in FIG. 11C.

[Another Table Example 3]

An allocation table which optimally controls allocations based on device configuration has been described above, but it is alternatively possible to control allocations based on a user-selected execution mode.

Figure 16:
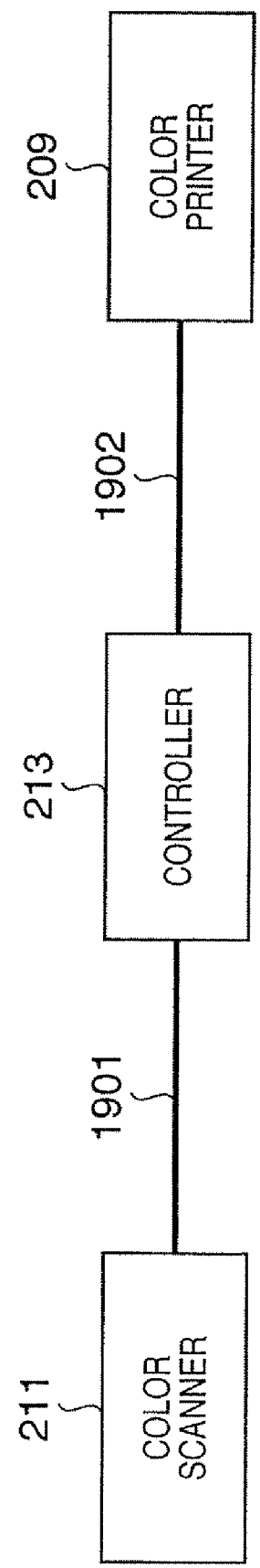
FIG. 16 is a diagram illustrating a connection state of a printer, scanner, and controller.

FIG. 16 is a schematic diagram illustrating a state of connection with the controller 216 in the configuration of the image processing apparatus 1000 shown in FIG. 2 when the device is capable of color copying with the printer 214 being a color printer and the scanner 215 being a color scanner, but the user intentionally specifies monochrome copy mode. These modules are connected via the system bus 201 as also described with reference to FIG. 2, but image signal bus levels are indicated in FIG. 16 to show the connection state in more detail.

In the example of FIG. 16, although the scanner 215 is color-capable, since the user specifies a monochrome mode operation as described above, monochrome image data is transmitted from the scanner 215 to the controller 216. Therefore, there is one image signal bus between the scanner 215 and controller 216. Also, although the printer 214 in the example of FIG. 16 is color-capable, since the user specifies a monochrome mode operation as described above, monochrome image data is transmitted from the controller 216 to the printer 214. Therefore, there is one image signal bus between the controller 216 and printer 214.

However, FIG. 16 illustrates a case in which monochrome copy mode is selected intentionally when a color scanner and color printer are connected. Thus, the other functions such as PLD and Send which can be executed simultaneously perform processing under the same conditions as the connection state shown in FIG. 14 unless monochrome mode is selected intentionally. That is, since processing is performed in color mode, data is exchanged among scanner 211, controller 213, and printer 209 actually via multiple data buses for color mode.

FIG. 17 is a diagram showing an exemplary table which describes the numbers of processing units 806 allocated to individual modules in each function (job) in the configuration shown in FIG. 16. As in the case of FIG. 10, figures in parentheses indicate the number of processing units 806 allocated to each type of image processing in each case. The reconfigurable processing unit allocation table has been described with reference to FIG. 10, and thus description thereof will be omitted here.

In the case of the Copy function in FIG. 17, one processing unit 806 each is allocated to the scanner, controller, and printer modules as when monochrome devices are connected. In the other functions, the same numbers of processing units are allocated as in color mode. Specifically, four processing units each are allocated to the controller and printer when executing PDL Print and three processing units each are allocated to the controller and printer when executing Send, as in the case of the table in FIG. 15.

Naturally, with the same device configuration, when executing PDL or Send, if monochrome mode is specified intentionally by the user, the allocation table assumes the same state as when monochrome devices are connected temporarily, as is the case with Copy described above. This makes it possible to perform a desired process using the minimum necessary number of processors.

When performing a Copy job under the conditions shown in FIG. 17, three processing units are allocated in total: one each to monochrome scan image processing, monochrome controller image processing, and monochrome print image processing. The usage in this case is shown in FIG. 11B.

[Another Table Example 4]

Figure 18:
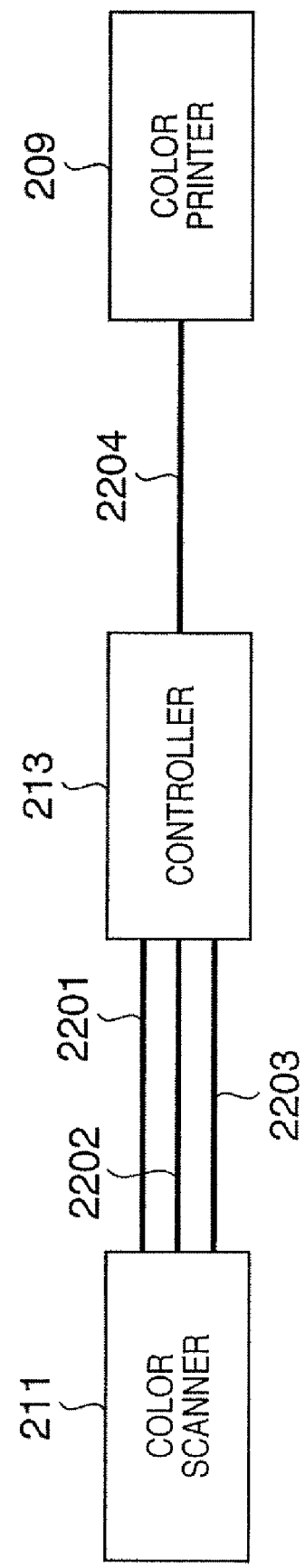
FIG. 18 is a diagram illustrating a connection state of a printer, scanner, and controller.

FIG. 18 is a schematic diagram illustrating a state of connection with the controller 216 in the configuration of the image processing apparatus 1000 shown in FIG. 2 when the printer 214 is a color printer and the scanner 215 is a color scanner. However, it is assumed in FIG. 18 that even though the device is capable of color copying, the function cannot be executed in color mode, but in monochrome mode because color toner has run out. These modules are connected via the system bus 201 as also described with reference to FIG. 2, but image signal bus levels are indicated in FIG. 18 to show the connection state in more detail.

In this way, the configuration according to this embodiment allows the number of allocated processing units to be changed appropriately according to not only device configuration, but also device status. Incidentally, as described later, changes to the number of allocated processing units 806 are made based on occurrence of predetermined events.

Since the scanner 215 in the example of FIG. 18 is a color scanner, color image data is transmitted from the scanner 215 to the controller 216. Therefore, there are three image signal buses for three colors of red, blue, and green between the scanner 215 and controller 216.

On the other hand, the printer 214 in the example of FIG. 18 is a color printer, but it can print only in monochrome mode because it is out of color toner. Consequently, monochrome image data is transmitted from the controller 216 to the printer 214. Therefore, there is one image signal bus between the controller 216 and printer 214.

In the example of FIG. 18, although the scanner 215 and printer 214 are color-capable, since the color toner has run out, the printer 214 can operate only in monochrome mode. Thus, the Copy and PDL functions, which use the printer 214, can operate only in monochrome mode, but the Send function, which does not use the printer 214, can run in color mode.

FIG. 19 is a diagram showing an exemplary table which describes the numbers of processing units 806 allocated to individual modules in each function (job) in the configuration shown in FIG. 18. As in the case of FIG. 10, figures in parentheses indicate the number of processing units 806 allocated to each type of image processing in each case. The reconfigurable processing unit allocation table has been described with reference to FIG. 10, and thus description thereof will be omitted here.

The usage of processing units 806 allocated to execute the Copy, PDL, and Send functions in this state are shown in FIGS. 11A, 11D, and 11C, respectively.

(Overall Processing)

Figure 20:
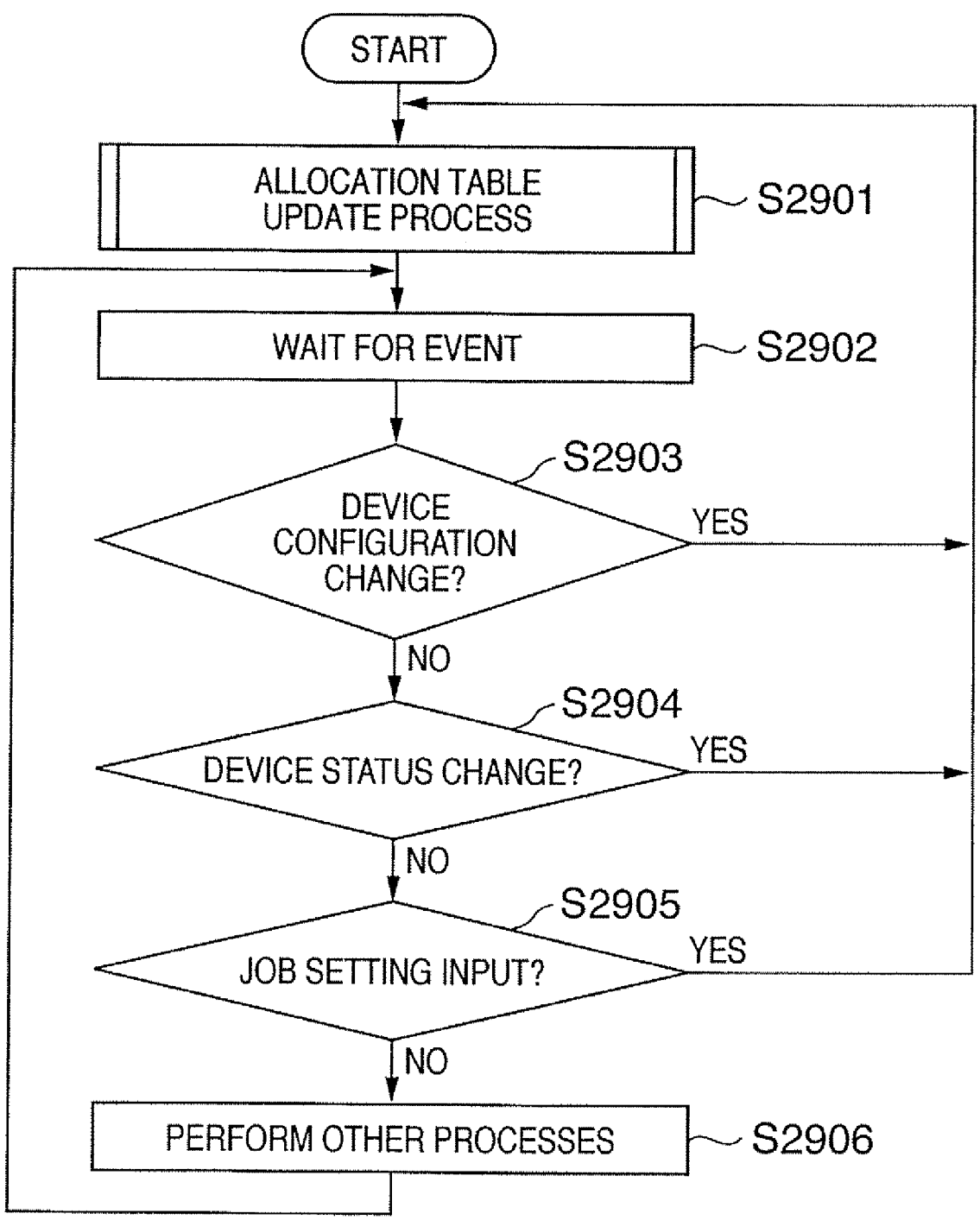
FIG. 20 is a flowchart showing a flow of an overall process.

FIG. 20 is a flowchart showing a flow of an overall process of reconfigurable processing unit allocation table update processes (hereinafter also referred to as table update processes) performed by the main controller 213.

Upon power-up, the image processing apparatus 1000 performs a first table update process by acquiring device configuration information about the image processing apparatus 1000 (Step S2901). The device configuration information includes, for example, information as to whether the printer and scanner are color-capable or not. After that, the image processing apparatus 1000 enters an event wait state (Step S2902).

If an event occurs in the event wait state in Step S2902, the image processing apparatus 1000 goes to Step S2903.

In Step S2903, the image processing apparatus 1000 determines whether the event is a device configuration change or not. That is, the image processing apparatus 1000 determines whether it is necessary or not to update the reconfigurable processing unit allocation table as a result of a device configuration change such as a change to a printer or scanner of capacity different from that of the previously connected device. If the event is a device configuration change (YES in Step S2903), the image processing apparatus 1000 returns to Step S2901 to carry out an allocation process (table update process) again. After that, it returns to an event wait state in Step S2902. If the event is not a device configuration change (NO in Step S2903), the image processing apparatus 1000 goes to Step S2904.

In Step S2904, the image processing apparatus 1000 determines whether the event is a device status change or not. That is, the image processing apparatus 1000 determines whether it is necessary or not to update the reconfigurable processing unit allocation table as a result of a device status change. Incidentally, status change events include a forcible shift to monochrome mode due to an out-of-color-toner situation and subsequent return to color mode as a result of color toner replenishment. If it is determined that the event is a device status change (YES in Step S2904), the image processing apparatus 1000 returns to Step S2901 to carry out an allocation process (table update process) again. After that, it returns to an event wait state in Step S2902. If it is determined that the event is not a device status change (NO in Step S2904), the image processing apparatus 1000 goes to Step S2905.

In Step S2905, the image processing apparatus 1000 determines whether the event is a job setting input or not. That is, the image processing apparatus 1000 determines whether it is necessary or not to update the reconfigurable processing unit allocation table as a result of a selection of execution mode by the user. Selections of execution mode by the user include, for example, intentional setting of execution mode to monochrome by the user. If it is determined that the event is a job setting input (YES in Step S2905), the image processing apparatus 1000 returns to Step S2901 to carry out an allocation process (table update process) again. After that, it returns to an event wait state in Step S2902. If it is determined that the event is not a job setting input (NO in Step S2905), the image processing apparatus 1000 goes to Step S2906.

When the image processing apparatus 1000 goes to Step S2906, there is no need to update the reconfigurable processing unit allocation table. Thus, in Step S2906, the image processing apparatus 1000 performs a predetermined process corresponding to the given event. After that, it returns to an event wait state in Step S2902.

In this way, with the configuration according to this embodiment, the table is updated in response to occurrence of a predetermined event and the allocation of processing units 806 is controlled based on the updated table. This makes it possible to control the allocation of processing units 806 appropriately according to the situation.

(Table Update Process)

Figure 21:
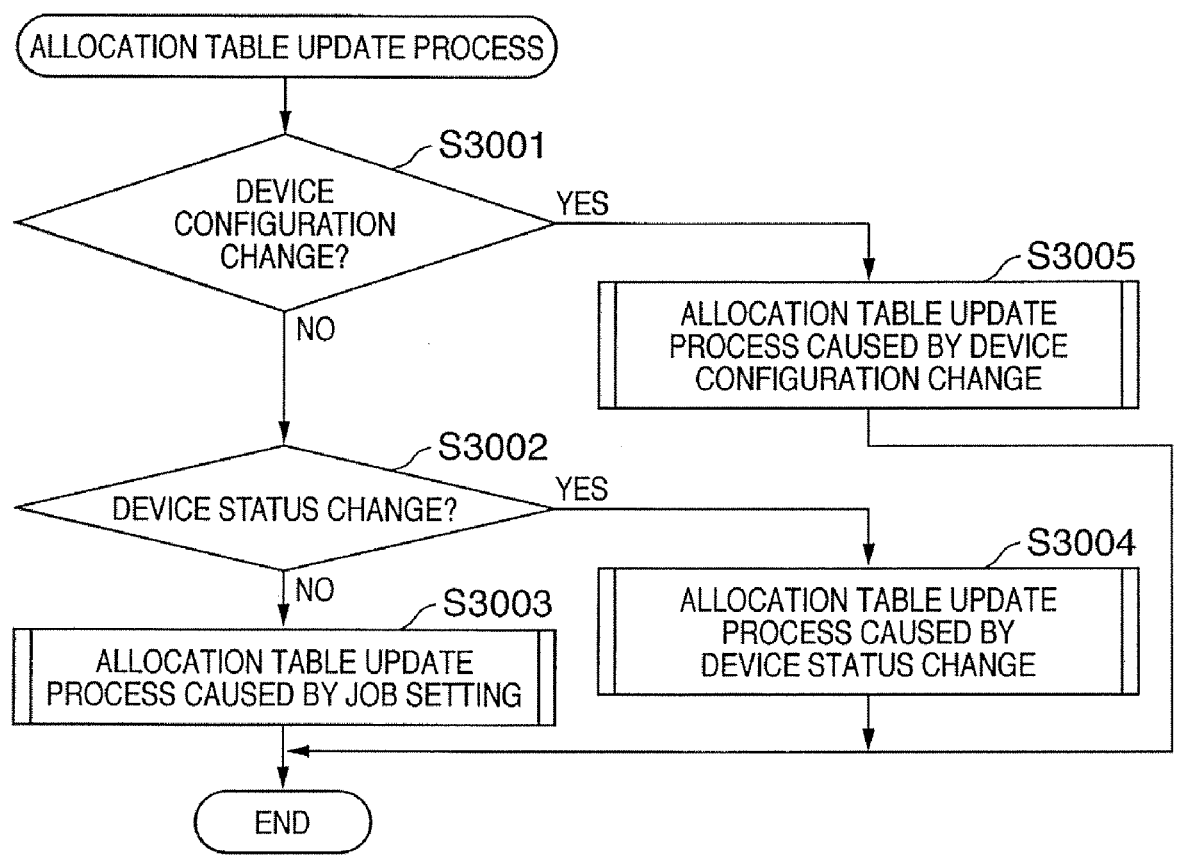
FIG. 21 is a flowchart showing a main flow of the process of updating a reconfigurable processing unit allocation table.

Next, details of the table update process performed in Step S2901 of the overall process will be described with reference to FIG. 21. FIG. 21 is a flowchart showing a main flow of the reconfigurable processing unit allocation table update process performed in Step S2901 of the flowchart in FIG. 20.

First, the image processing apparatus 1000 determines whether the update to the reconfigurable processing unit allocation table is due to a device configuration change or not (Step S3001). If it is found that the update is due to a device configuration change (YES in Step S3001), the image processing apparatus 1000 goes to Step S3005. In Step S3005, the image processing apparatus 1000 performs a reallocation process to reflect the device configuration change (allocation update process as a result of a device configuration change). After that, the image processing apparatus 1000 finishes processing. Details of the reallocation process will be described later.

If it is found in Step S3001 that the update to the reconfigurable processing unit allocation table is not due to a device configuration change, the image processing apparatus 1000 goes to Step S3002. In Step S3002, the image processing apparatus 1000 determines whether the update to the reconfigurable processing unit allocation table is due to a device status change or not. If it is found that the update is due to a device status change (YES in Step S3002), the image processing apparatus 1000 goes to Step S3004. In Step S3004, the image processing apparatus 1000 performs a reallocation process to reflect the device status change (allocation update process as a result of a device status change). After that, the image processing apparatus 1000 finishes processing. Details of the reallocation process will be described later.

If it is found in Step S3002 that the update to the reconfigurable processing unit allocation table is not due to a device status change, the image processing apparatus 1000 determines that this is an allocation update process as a result of a job setting, and goes to Step S3003. In Step S3003, the image processing apparatus 1000 performs a reallocation process to reflect the job setting (allocation update process as a result of a job setting). After that, the image processing apparatus 1000 finishes processing. Details of the reallocation process will be described later.

(Update Process Caused by Device Configuration Change)

Figure 22:
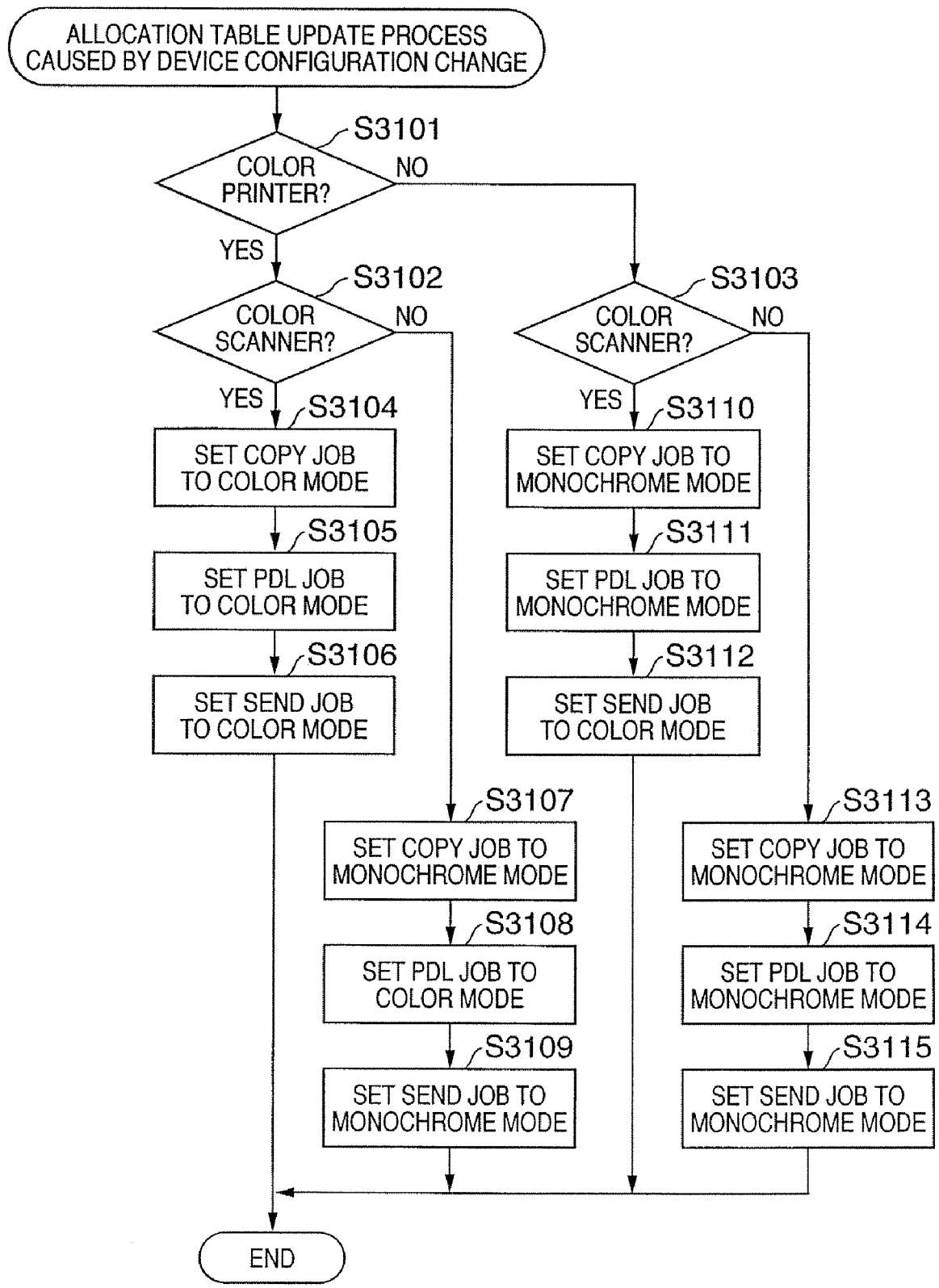
FIG. 22 is a flowchart showing a detailed flow of a reconfigurable processing unit allocation table update process caused by a device configuration change.

Next, details of the allocation update process performed in Step S3005 of the table update process as a result of a device configuration change will be described with reference to FIG. 22. FIG. 22 is a flowchart showing a detailed flow of the reconfigurable processing unit allocation table update process performed in Step S3005 in FIG. 21 as a result of a device configuration change.

First, the image processing apparatus 1000 determines whether the connected printer is a color printer or not (Step S3101). If it is found that the connected printer is a color printer (YES in Step S3101), the image processing apparatus 1000 goes to Step S3102.

In Step S3102, the image processing apparatus 1000 further determines whether the connected scanner is a color scanner or not. If it is found in Step S3102 that the connected scanner is a color scanner (YES in Step S3102), the image processing apparatus 1000 goes to Step S3104. Otherwise (NO in Step S3102), the image processing apparatus 1000 goes to Step S3107.

When the image processing apparatus 1000 goes to Step S3104, the connected printer and scanner are both color-capable, and color mode is enabled in all the functions of Copy, PDL, and Send. Thus, in Step S3104, the Copy function in the reconfigurable processing unit allocation table is set to color mode. Next, in Step S3105, the PDL function in the reconfigurable processing unit allocation table is set to color mode. Furthermore, in Step S3106, the Send function in the reconfigurable processing unit allocation table is set to color mode. After that, the image processing apparatus 1000 finishes the processing.

When the image processing apparatus 1000 goes to Step S3107, the connected printer is color-capable and scanner is monochrome. Thus, the Copy and Send functions can operate only in monochrome mode due to the capability limit of the scanner. On the other hand, the PDL function, which does not use the scanner, can operate in color mode. Thus, in Step S3107, the Copy function in the reconfigurable processing unit allocation table is set to monochrome mode. Next, in Step S3108, the PDL function in the reconfigurable processing unit allocation table is set to color mode. Furthermore, in Step S3109, the Send function in the reconfigurable processing unit allocation table is set to monochrome mode. After that, the image processing apparatus 1000 finishes processing.

On the other hand, if it is found in Step S3101 that the connected printer is a monochrome printer rather than a color printer (NO in Step S3101), the image processing apparatus 1000 goes to Step S3103.

In Step S3103, the image processing apparatus 1000 determines whether the connected scanner is color-capable or not. If it is found in Step S3103 that the connected scanner is a color scanner (YES in Step S3103), the image processing apparatus 1000 goes to Step S3110. Otherwise (NO in Step S3103), the image processing apparatus 1000 goes to Step S3113.

When the image processing apparatus 1000 goes to Step S3110, the connected printer is monochrome and scanner is color-capable. Thus, the Copy and PDL functions can operate only in monochrome mode due to the capability limit of the printer. On the other hand, the Send function, which does not use the printer, can operate in color mode. Thus, in Step S3110, the Copy function in the reconfigurable processing unit allocation table is set to monochrome mode. Next, in Step S3111, the PDL function in the reconfigurable processing unit allocation table is set to monochrome mode. Furthermore, in Step S3112, the Send function in the reconfigurable processing unit allocation table is set to color mode. After that, the image processing apparatus 1000 finishes processing.

When the image processing apparatus 1000 goes to Step S3113, the connected printer and scanner are both monochrome. Consequently, all the functions of Copy, PDL, and Send can operate only in monochrome mode. Thus, in Step S3113, the Copy function in the reconfigurable processing unit allocation table is set to monochrome mode. Next, in Step S3114, the PDL function in the reconfigurable processing unit allocation table is set to monochrome mode. Furthermore, in Step S3115, the Send function in the reconfigurable processing unit allocation table is set to monochrome mode. After that, the image processing apparatus 1000 finishes processing.

(Update Process Caused by Device Status Change)

Figure 23:
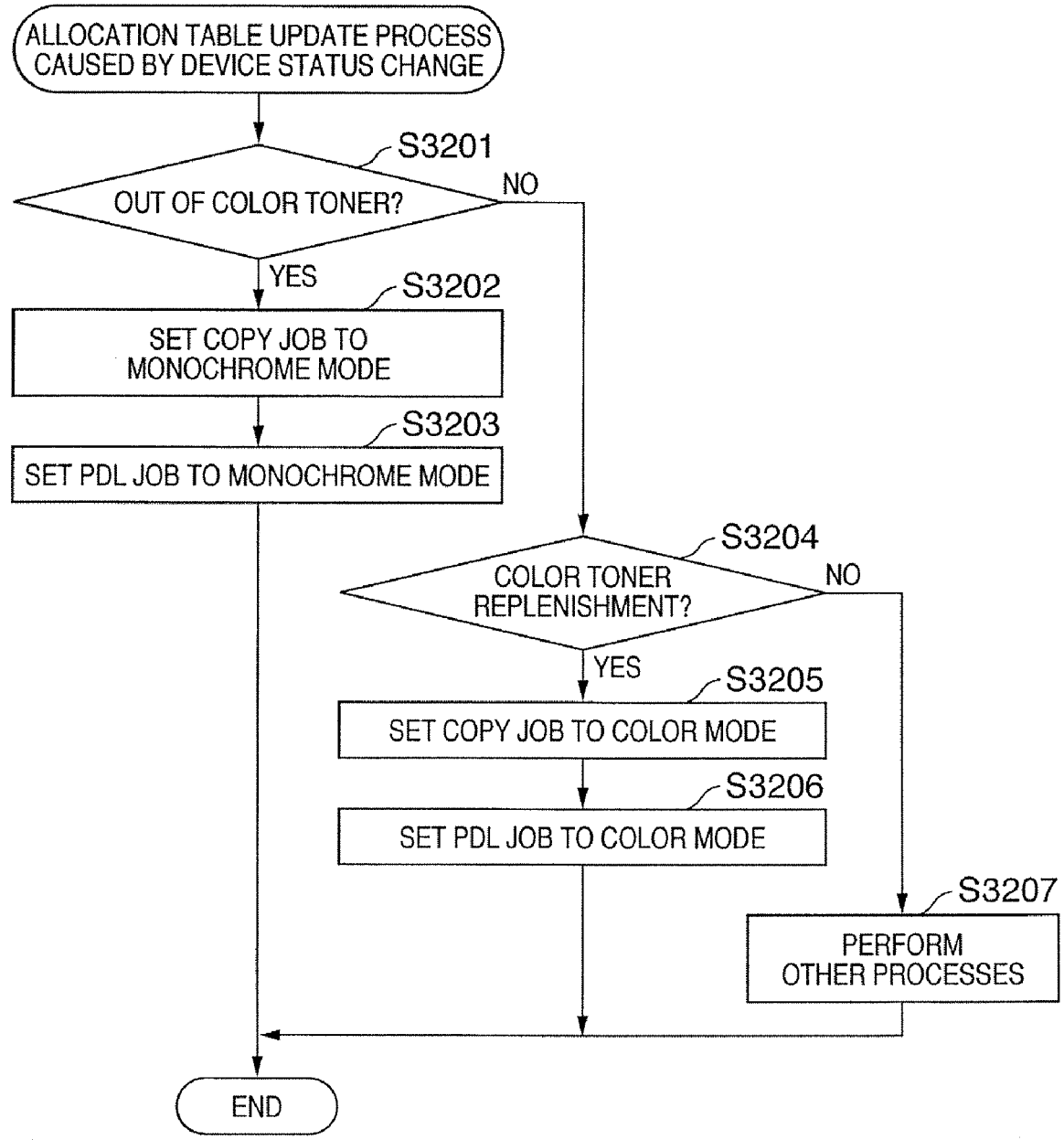
FIG. 23 is a flowchart showing a detailed flow of a reconfigurable processing unit allocation table update process caused by a device status change.

Next, details of the allocation update process performed in Step S3004 of the table update process as a result of a device status change will be described with reference to FIG. 23. FIG. 23 is a flowchart showing a detailed flow of the reconfigurable processing unit allocation table update process performed in Step S3004 in FIG. 21 as a result of a device status change.

First, the image processing apparatus 1000 determines whether the device status change is an out-of-color-toner condition or not (Step S3201). If it is found that the device status change is an out-of-color-toner condition (YES in Step S3201), the image processing apparatus 1000 goes to Step S3202. Otherwise (NO in Step S3201), the image processing apparatus 1000 goes to Step S3204.

When the image processing apparatus 1000 goes to Step S3202, the Copy and PDL functions which use the printer can operate only in monochrome mode. Thus, in Step S3202, the Copy function in the reconfigurable processing unit allocation table is set to monochrome mode. Next, in Step S3203, the PDL function in the reconfigurable processing unit allocation table is set to monochrome mode. After that, the image processing apparatus 1000 finishes processing.

In Step S3204, the image processing apparatus 1000 determines whether the device status change is color toner replenishment or not. If it is found that the device status change is color toner replenishment (YES in Step S3204), the image processing apparatus 1000 goes to Step S3205. Otherwise (NO in Step S3204), the image processing apparatus 1000 goes to Step S3207.

When the image processing apparatus 1000 goes to Step S3205, the Copy and PDL functions which use the printer can operate in color mode. Thus, in Step S3205, the Copy function in the reconfigurable processing unit allocation table is set to color mode. Next, in Step S3206, the PDL function in the reconfigurable processing unit allocation table is set to color mode. After that, the image processing apparatus 1000 finishes processing.

The image processing apparatus 1000 goes to Step S3207 when it determines that the device status change is such that does not require the reconfigurable processing unit allocation table to be updated. Thus, the image processing apparatus 1000 performs other processes in Step S3207 and finishes processing. Specific process contents in Step S3207 are designed appropriately according to the uses and purposes of actual configuration.

When allocating general-purpose processing units to perform desired image processing as described above, if the device is temporarily unable to execute desired functions, the processing units are allocated regardless of the device configuration and user specified functions. That is, the priority of processing unit allocation to the execution of the desired functions is set lower than usual.

When the priority of general-purpose processing unit allocation is lower than usual because the device is temporarily unable to execute desired functions, if the device returns to a normal state in which it can execute the desired functions, the priority of general-purpose processing unit allocation is returned to normal.

In this way, the configuration according to this embodiment makes it possible to control the allocation of processor resources appropriately according to device status.

(Update Process Caused by Job Setting)

Next, details of the allocation update process performed in Step S3003 of the table update process as a result of a job setting will be described with reference to FIG. 24. FIG. 24 is a flowchart showing a detailed flow of the reconfigurable processing unit allocation table update process performed in Step S3003 in FIG. 21 as a result of job setting.

First, in Step S3301 the image processing apparatus 1000 determines whether the type of job set by the user is Send or not. If it is found that the job type is Send (YES in Step S3301), the image processing apparatus 1000 goes to Step S3305. Otherwise (NO in Step S3301), the image processing apparatus 1000 goes to Step S3302.

In Step S3305, the image processing apparatus 1000 determines whether the mode set by the user is monochrome or not. If it is found in Step S3305 that the mode set by the user is monochrome (YES in Step S3305), the image processing apparatus 1000 sets the Send function in the reconfigurable processing unit allocation table to monochrome mode (Step S3315) and then finishes processing.

If it is found in Step S3305 that the mode set by the user is not monochrome (NO in Step S3305), the image processing apparatus 1000 goes to Step S3314. In Step S3314, the image processing apparatus 1000 determines whether the mode set by the user is color or not. If it is found in Step S3314 that the mode set by the user is color (YES in Step S3314), the image processing apparatus 1000 sets the Send function in the reconfigurable processing unit allocation table to color mode (Step S3316) and then finishes processing.

If it is found in Step S3314 that the mode set by the user is not color either (NO in Step S3314), the image processing apparatus 1000 goes to Step S3317. The image processing apparatus 1000 goes to Step S3317 when it determines that the job setting is such that does not require the reconfigurable processing unit allocation table to be updated. Thus, the image processing apparatus 1000 performs a predetermined process in Step S3317 and then finishes processing. Specific process contents in Step S3317 are designed appropriately according to the uses and purposes of actual configuration.

On the other hand, in Step S3302, the image processing apparatus 1000 determines whether the type of job set by the user is PDL or not. If it is found that the job type is PDL (YES in Step S3302), the image processing apparatus 1000 goes to Step S3304. Otherwise (NO in Step S3302), the image processing apparatus 1000 goes to Step S3303.

In Step S3304, the image processing apparatus 1000 determines whether the mode set by the user is monochrome or not. If it is found in Step S3304 that the mode set by the user is monochrome (YES in Step S3304), the image processing apparatus 1000 sets the PDL function in the reconfigurable processing unit allocation table to monochrome mode (Step S3311) and then finishes processing.

If it is found in Step S3304 that the mode set by the user is not monochrome (NO in Step S3304), the image processing apparatus 1000 goes to Step S3310. In Step S3310, the image processing apparatus 1000 determines whether the mode set by the user is color or not. If it is found in Step S3310 that the mode set by the user is color (YES in Step S3310), the image processing apparatus 1000 sets the PDL function in the reconfigurable processing unit allocation table to color mode (Step S3312) and then finishes processing.

If it is found in Step S3310 that the mode set by the user is not color either (NO in Step S3310), the image processing apparatus 1000 goes to Step S3313. The image processing apparatus 1000 goes to Step S3313 when it determines that the job setting is such that does not require the reconfigurable processing unit allocation table to be updated. The image processing apparatus 1000 performs a predetermined process in Step S3313 and then finishes processing. Specific process contents in Step S3313 are designed appropriately according to the uses and purposes of actual configuration.

On the other hand, the image processing apparatus 1000 goes to Step S3303 when it determines that the type of job set by the user is Copy, the remaining job type. In Step S3303, the image processing apparatus 1000 determines whether the mode set by the user is monochrome or not. If it is found in Step S3303 that the mode set by the user is monochrome (YES in Step S3303), the image processing apparatus 1000 sets the Copy function in the reconfigurable processing unit allocation table to monochrome mode (Step S3307) and then finishes processing.

If it is found in Step S3303 that the mode set by the user is not monochrome (NO in Step S3303), the image processing apparatus 1000 goes to Step S3306. In Step S3306, the image processing apparatus 1000 determines whether the mode set by the user is color or not. If it is found in Step S3306 that the mode set by the user is color (YES in Step S3306), the image processing apparatus 1000 sets the Copy function in the reconfigurable processing unit allocation table to color mode (Step S3308) and then finishes processing.

If it is found in Step S3306 that the mode set by the user is not color either (NO in Step S3306), the image processing apparatus 1000 goes to Step S3309. The image processing apparatus 1000 goes to Step S3309 when it determines that the job setting is such that does not require the reconfigurable processing unit allocation table to be updated. The image processing apparatus 1000 performs a predetermined process in Step S3309 and then finishes processing. Specific process contents in Step S3309 are designed appropriately according to the uses and purposes of actual configuration.

Incidentally, although the allocation of processing units 806 is controlled above based on whether image processing is performed in monochrome mode or color mode, it is obvious that allocation control may be based on something else. Now description will be given of allocation control which is performed in image processing based on a parameter other than color. Specifically, processing units 806 are allocated here based on whether or not a recording medium (recording paper) is a cardboard. Although it is assumed below that the allocation table is updated in response to a parameter setting by the user, an equivalent process may be performed based on, for example, the type of recording paper identified automatically by the image processing apparatus.

FIG. 25 is a flowchart showing a detailed flow of the reconfigurable processing unit allocation table update process performed in Step S3003 in FIG. 21 as a result of job setting.

First, in Step S3501 the image processing apparatus 1000 determines whether the type of job set by the user is Send or not. If it is found that the job type is Send (YES in Step S3501), the image processing apparatus 1000 goes to Step S3505. Otherwise (NO in Step S3501), the image processing apparatus 1000 goes to Step S3502.

In Step S3505, the image processing apparatus 1000 determines whether the mode set by the user is monochrome or not. If it is found in Step S3505 that the mode set by the user is monochrome (YES in Step S3505), the image processing apparatus 1000 sets the Send function in the reconfigurable processing unit allocation table to monochrome mode (Step S3514) and then finishes processing.

If it is found in Step S3505 that the mode set by the user is not monochrome (NO in Step S3505), the image processing apparatus 1000 goes to Step S3515. The image processing apparatus 1000 goes to Step S3515 when it determines that the job setting is such that does not require the reconfigurable processing unit allocation table to be updated. The image processing apparatus 1000 performs a predetermined process in Step S3515 and then finishes processing. Specific process contents in Step S3515 are designed appropriately according to the uses and purposes of actual configuration.

On the other hand, in Step S3502, the image processing apparatus 1000 determines whether the type of job set by the user is PDL or not. If it is found that the job type is PDL (YES in Step S3502), the image processing apparatus 1000 goes to Step S3504. Otherwise (NO in Step S3502), the image processing apparatus 1000 goes to Step S3503.

In Step S3504, the image processing apparatus 1000 determines whether the mode set by the user is monochrome or not. If it is found in Step S3504 that the mode set by the user is monochrome (YES in Step S3504), the image processing apparatus 1000 sets the PDL function in the reconfigurable processing unit allocation table to monochrome mode (Step S3510) and then finishes processing.

If it is found in Step S3504 that the mode set by the user is not monochrome (NO in Step S3504), the image processing apparatus 1000 goes to Step S3511. In Step S3511, the image processing apparatus 1000 determines whether the mode set by the user is cardboard or not. If it is found in Step S3511 that the mode set by the user is cardboard (YES in Step S3511), the image processing apparatus 1000 sets the PDL function in the reconfigurable processing unit allocation table to half speed mode (Step S3512) and then finishes processing.

If it is found in Step S3511 that the mode set by the user is not cardboard either (NO in Step S3511), the image processing apparatus 1000 goes to Step S3513. The image processing apparatus 1000 goes to Step S3513 when it determines that the job setting is such that does not require the reconfigurable processing unit allocation table to be updated. The image processing apparatus 1000 performs a predetermined process in Step S3513 and then finishes processing. Specific process contents in Step S3513 are designed appropriately according to the uses and purposes of actual configuration.

On the other hand, the image processing apparatus 1000 goes to Step S3503 when it determines that the type of job set by the user is Copy, the remaining job type. In Step S3503, the image processing apparatus 1000 determines whether the mode set by the user is monochrome or not. If it is found in Step S3503 that the mode set by the user is monochrome (YES in Step S3503), the image processing apparatus 1000 sets the Copy function in the reconfigurable processing unit allocation table to monochrome mode (Step S3506) and then finishes processing.

If it is found in Step S3503 that the mode set by the user is not monochrome (NO in Step S3503), the image processing apparatus 1000 goes to Step S3507. In Step S3507, the image processing apparatus 1000 determines whether the mode set by the user is cardboard or not. If it is found in Step S3507 that the mode set by the user is cardboard (YES in Step S3507), the image processing apparatus 1000 sets the Copy function in the reconfigurable processing unit allocation table to half speed mode (Step S3508) and then finishes processing.

If it is found in Step S3507 that the mode set by the user is not cardboard either (NO in Step S3507), the image processing apparatus 1000 goes to Step S3509. The image processing apparatus 1000 goes to Step S3509 when it determines that the job setting is such that does not require the reconfigurable processing unit allocation table to be updated. The image processing apparatus 1000 performs a predetermined process in Step S3509 and then finishes processing. Specific process contents in Step S3509 are designed appropriately according to the uses and purposes of actual configuration.

As described above, in a configuration according to this embodiment, a table is stored which represents correspondence between conditions for image processing and the numbers of processing units 806 which perform module processes. Microprograms corresponding to the module processes are supplied to processing units 806 with reference to the table. Thus, the configuration according to this embodiment ensures uniform throughput of image processing while maintaining overall system throughput by allocating the necessary minimum processing units 806.

By appropriately updating contents of the allocation table as required in response to occurrence of an event such as a device configuration change, device status change, user setting, it is possible to control the allocation of processing units 806 according to the situation. This makes it possible to equalize throughput among processes and allocate necessary and sufficient processor resources to the processes which need them.

Needless to say, the above configuration is applicable not only to image processing device such as multi-functional peripheral device, but also to any device which performs processing by means of reconfigurable processors. The allocation of processor resources can be controlled appropriately according to the uses and purposes of actual configuration using the same technique as the one used in the configuration according to this embodiment.

Also, in the above configuration, the allocation of processor resources is controlled according to the processing power required of devices to execute functions, and the allocation of processor resources can be kept within the processing power of the devices. More specifically, comparison is made between the maximum processing power per unit time required of the devices to execute functions and processing speed of various image processing performed by general-purpose processing units. If the processing speed of the general-purpose processing units is higher, the allocation of general-purpose processing units is kept within the current level. This prevents waste of processor resources.

Also, if restrictions on execution mode of a function make the processing speed during execution of the function lower than the processing speed usually achieved by devices, the allocation of general-purpose processing units is controlled by regarding the processing speed lower than usual to be execution speed of the devices. This prevents waste of processor resources even if there are restrictions due to execution mode of a function.

Also, the allocation of processing units may be controlled based on priority assigned to each job. That is, when two or more functions are executed simultaneously on device, general-purpose processing units may be assigned to the functions based on execution priority of the functions. This makes it possible to execute functions in order of importance when two or more functions are executed simultaneously. Incidentally, correspondence between the types of function and their importance can be preset in a storage device such as the primary storage device 203 or secondary storage device 204.

Also, when two or more functions are executed simultaneously on device, there may be cases due to the limitation or the number of general-purpose processing units in which it is not possible to allocated as many general-purpose processing units as specified in the table to all the functions. In such cases, for example, large numbers of units can be allocated to high-priority functions while allocating small numbers of units to low-priority functions. This configuration will make it possible to perform high-priority processes at a desired speed, and low-priority processes at a low speed.

Also, there may be cases in which the number of general-purpose processing modules (units) which can be allocated to a function does not reach a certain level needed to perform processes of the function. In such cases, if the function has a low priority, it is possible to refrain from allocating general-purpose processing modules to that function until processes of the other functions are finished. This will make it possible to perform processes of higher priority preferentially.

The priority can be determined based on whether or not given processes of the function need to be performed in real time. For example, high priority can be assigned to the processes which need to be performed in real time and low priority can be assigned to the processes which do not need to be performed in real time.

Also, the numbers of general-purpose processing units allocated to the functions which do not need to be performed in real time can be designed to be increased and decreased dynamically during execution of the functions.

As described above, with the configuration according to this embodiment, image processing capabilities required of multi-functional peripheral device are implemented using reconfigurable processors. This makes it possible to avoid cost increases due to bloating hardware size, give previously unavailable versatility to controllers of multi-functional peripheral device, and thereby create an environment for efficiently implementing the capabilities required of multi-functional peripheral device.

Although an exemplary embodiment has been described in detail above, the present invention can take the form of, for example, a system, apparatus, method, program, or storage medium. Specifically, the present invention may be applied either to a system consisting of multiple apparatus or to device consisting of a single apparatus.

Incidentally, the present invention is also achieved when program code of software programs which implement the functions of the above embodiment is supplied directly or remotely to a system or apparatus and read out and executed by a computer of the system or apparatus.

Thus, the program code itself installed on the computer to implement functions and processes of the present invention on the computer also implements the present invention. That is, the present invention also includes the computer programs which implement the functions and processes of the present invention.

In that case, the program code may take any form including object code, programs executed by an interpreter, and script data supplied to an OS as long as it has program functions.

Recording media available for use to supply programs include, for example, floppy (registered trademark) disks, hard disks, optical disks, magneto-optical disks, MO, CD-ROM, CD-R, CD-RW, magnetic tape, non-volatile memory cards, ROM, DVD (DVD-ROM and DVD-R), etc.

The programs can also be supplied by allowing the user to connect to an Internet homepage using a browser on a client computer and download the computer programs themselves of the present invention or a compressed self-installing file from the homepage onto a recording medium such as a hard disk. Also, the program code of the programs according to the present invention may be divided into multiple files, which can be downloaded from respective homepages. That is, the present invention also includes WWW servers which allow multiple users to download program files capable of implementing the functions and processes of the present invention on a computer.

The present invention can also be implemented by supplying users with a storage medium such as a CD-ROM containing the programs of the present invention in encrypted form, providing key information for decryption to the user who satisfies predetermined conditions through a download from an Internet homepage, and allowing the user to decrypt and install the programs on a computer using the key information.

The functions of the above embodiment may be implemented not only by the programs read out and executed by the computer, but also by part or all of the actual processing executed, in accordance with instructions from the programs, by an OS or the like running on the computer.

Furthermore, the functions of the above embodiment may also be implemented by part or all of the actual processing executed by a CPU or the like contained in a function expansion board inserted in the computer or a function expansion unit connected to the computer if the processing is performed in accordance with instructions from the programs that have been read out of the recording medium and written into memory on the function expansion board or unit.

As described above, the present invention makes it possible to provide a technique for allocating general-purpose processing modules appropriately according to the situation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-351306, filed Dec. 5, 2005, which is hereby incorporated by reference herein in its entirety.

What is claimed is:

1. An image processing apparatus which includes a plurality of image processing modules, comprising:
   a plurality of computing units each of which is programmable;
   a storage unit adapted to store plural types of programs that are to be loaded into the plurality of computing units;
   a determination unit adapted to determine the number of computing units, which are to be allocated to each of the plurality of image processing modules, among the plurality of image processing modules, based on an image processing mode that is executed by the plurality of image processing modules and whether or not the image processing apparatus includes a necessary resource for executing an image processing;
   a specifying unit adapted to specify each of a plurality of programs for executing processes using each of the plurality of image processing modules, among the plural types of programs that are stored in the storage unit; and
   a control unit adapted to control to load each of the plurality of programs that are specified by the specifying unit from the storage unit into the computing units, of which the number is identical to the number determined by the determination unit.

2. The image processing apparatus according to claim 1, wherein each of the plurality of image processing modules is a scanner, a controller, or a printer.

3. The image processing apparatus according to claim 1, wherein the image processing mode is a monochrome mode or a color mode.

4. The image processing apparatus according to claim 3, wherein the determination unit determines larger number of the computing units when the image processing mode is the color mode than the number when the image processing mode is the monochrome mode.

5. The image processing apparatus according to claim 3, wherein the color mode is a RGB color mode or a CMYK color mode.

6. The image processing apparatus according to claim 5, wherein the determination unit determines larger number of the computing units when the image processing mode is the CMYK color mode than the number when the image processing mode is the RGB color mode.

7. The image processing apparatus according to claim 1, wherein the determination unit determines the number of the computing units based on the image processing mode that is executed by the plurality of image processing modules, whether or not the image processing apparatus includes a necessary resource for executing an image processing, and the type of a job that is executed by the image processing apparatus.

8. The image processing apparatus according to claim 7, wherein the type of the job is a copy, a PDL print, or a data sending.

9. The image processing apparatus according to claim 1, wherein the necessary resource for executing the image processing is a color toner.

10. An image processing method performed by an image processing apparatus which includes a plurality of computing units each of which is programmable, a storage unit adapted to store plural types of programs that are to be loaded into the plurality of computing units, and a plurality of image processing modules, comprising:
    determining the number of computing units, which are to be allocated to each of the plurality of image processing modules, among the plurality of image processing modules, based on an image processing mode that is executed by the plurality of image processing modules and whether or not the image processing apparatus includes a necessary resource for executing an image processing;
    specifying each of a plurality of programs for executing processes using each of the plurality of image processing modules, among the plural types of programs that are stored in the storage unit; and
    controlling to load each of the plurality of programs that are specified in the step of specifying from the storage unit into the computing units, of which the number is identical to the number determined in the step of determining.

* * * * *